US012668655B2

(12) United States Patent
Kim et al.

(10) Patent No.: US 12,668,655 B2
(45) Date of Patent: Jun. 30, 2026

(54) CURABLE COMPOSITION

(71) Applicant: LG Chem, Ltd., Seoul (KR)

(72) Inventors: Woo Yeon Kim, Daejeon (KR); Song A Chae, Daejeon (KR); Kwang Su Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 648 days.

(21) Appl. No.: 18/024,858

(22) PCT Filed: Aug. 26, 2021

(86) PCT No.: PCT/KR2021/011421
§ 371 (c)(1),
(2) Date: Mar. 6, 2023

(87) PCT Pub. No.: WO2022/071667
PCT Pub. Date: Apr. 7, 2022

(65) Prior Publication Data

US 2023/0312796 A1 Oct. 5, 2023

(30) Foreign Application Priority Data

Sep. 29, 2020 (KR) ........................ 10-2020-0127537
Aug. 18, 2021 (KR) ........................ 10-2021-0109008

(51) Int. Cl.
*C08K 3/22* (2006.01)
*C08F 265/06* (2006.01)
*C08K 5/14* (2006.01)

(52) U.S. Cl.
CPC .............. *C08F 265/06* (2013.01); *C08K 3/22* (2013.01); *C08K 5/14* (2013.01); *C08K 2003/2227* (2013.01); *C08K 2201/014* (2013.01)

(58) Field of Classification Search
CPC ................. C08L 9/00; C08L 2205/025; C08L 2205/035; C08K 3/013; C08K 3/36; C08K 5/0025; C08K 5/548; C08K 2201/006; B60C 1/0016; B60C 2200/04
USPC .......................................................... 524/560
See application file for complete search history.

(56) References Cited

U.S. PATENT DOCUMENTS

| | | | | |
|---|---|---|---|---|
| 2007/0142528 | A1 | 6/2007 | Oshima et al. | |
| 2010/0036050 | A1* | 2/2010 | Iwa | C08G 65/2663 524/588 |
| 2010/0072416 | A1 | 3/2010 | Fujioka et al. | |
| 2011/0245373 | A1 | 10/2011 | Yoda | |
| 2016/0009963 | A1 | 1/2016 | Sugita | |
| 2017/0275202 | A1* | 9/2017 | Peraire | C04B 20/1037 |
| 2018/0076493 | A1 | 3/2018 | Park et al. | |
| 2020/0031028 | A1 | 1/2020 | Suzuki et al. | |

FOREIGN PATENT DOCUMENTS

| | | | |
|---|---|---|---|
| CN | 102307939 | A | 1/2012 |
| JP | 2012162612 | A | 8/2012 |
| JP | 2015067637 | A | 4/2015 |
| KR | 100482928 | B1 | 4/2005 |
| KR | 100995256 | B1 | 11/2010 |
| KR | 20150016496 | A | 2/2015 |
| KR | 20160084293 | A | 7/2016 |
| KR | 20160105354 | A | 9/2016 |
| KR | 20200012775 | A | 2/2020 |
| WO | 2008053753 | A1 | 5/2008 |

OTHER PUBLICATIONS

International Search Report for PCT/KR2021/011421 mailed Dec. 14, 2021. 3 pgs.
Search Report dated Jun. 14, 2024 from the Office Action for Chinese Application No. 202180061911.3 issued Jun. 19, 2024, 2 pages.

* cited by examiner

*Primary Examiner* — Hannah J Pak
(74) *Attorney, Agent, or Firm* — Lerner David LLP

(57) ABSTRACT

The present application may provide a curable composition comprising a filler composition, an acryl monomeric component and an acryl polymeric component, wherein one or more of the acryl monomeric component and polymerization units of the acryl polymeric component comprises a cyclic ether-based acryl compound. Such curable composition is capable of ensuring excellent storage stability regardless of environmental changes by having excellent resistance to moisture and humidity; exhibits room temperature curability and quick curability in a high humidity environment even if an excessive amount of a filler composition is included; exhibits appropriate viscosity, thixotropy, adhesion and/or thermal conductivity before and after curing; and is capable of forming a cured product which is not brittle and flexible by adjusting hardness.

19 Claims, No Drawings

CURABLE COMPOSITION

CROSS-REFERENCE TO RELATED APPLICATIONS

The present application is a national stage entry under 35 U.S.C. § 371 of International Application No. PCT/KR2021/011421 filed on Aug. 26, 2021, which claims priority from Korean Patent Applications No. 10-2020-0127537 filed on Sep. 29, 2020 and No. 10-2021-0109008 filed on Aug. 18, 2021, all the disclosures of which are incorporated herein by reference.

TECHNICAL FIELD

The present application relates to a curable composition.

BACKGROUND ART

As the treatment of heat generated from electric products, electronic products or batteries such as secondary batteries, becomes an important issue, various heat dissipation countermeasures have been proposed.

Among the thermally conductive materials used for heat dissipation countermeasures, resin compositions in which thermally conductive fillers are blended with resins are known.

In Patent Document 1 (Korean Patent Application Laid-Open No. 10-2016-0105354), a battery module to which such a resin composition is applied is known.

Among the known resins, a typical resin with excellent heat resistance is a silicone resin, so that in such materials, the silicone resin is often used as the resin.

However, since the silicone resin has poor adhesive force, there is a problem that the use of the resin composition is limited.

A thermally conductive resin composition to which polyurethane having excellent adhesive force is applied is also known. However, since the polyurethane-based material is vulnerable to moisture or humidity, the resin composition to which it is applied has poor storage stability, and it is not easy to secure appropriate curability in high humidity periods such as the rainy season.

DISCLOSURE

Technical Problem

It is an object of the present application to provide a curable composition that has excellent resistance to moisture and humidity, thereby being capable of ensuring excellent storage stability regardless of environmental changes.

Also, it is an object of the present application to provide a curable composition that exhibits room temperature curability and quick curability in a high humidity environment, even if an excessive amount of a filler composition is included.

In addition, it is an object of the present application to provide a curable composition exhibiting appropriate viscosities, thixotropy, adhesion and/or thermal conductivities before and after curing.

Furthermore, it is an object of the present application to provide a curable composition capable of forming a flexible cured product without brittleness by adjusting the hardness.

Technical Solution

Among the physical properties mentioned in the present application, when the measured temperature affects the physical property, the relevant physical property is the physical property measured at room temperature, unless otherwise specified.

The term room temperature as used herein is a natural temperature without warming or cooling, which may mean, for example, any one temperature within the range of 10° C. to 30° C., for example, a temperature of about 15° C. or more, about 18° C. or more, about 20° C. or more, about 23° C. or more, about 27° C. or less, or 25° C.

The term 'a to b' as used herein means 'within the range between a and b while including a and b'. For example, the fact that includes a to b parts by weight has the same meaning as included in the range of a to b parts by weight.

The term relative humidity as used herein is expressed as a percentage (%) of the ratio of the amount of water vapor contained in the current air of a unit volume to the saturated vapor pressure that the air of the unit volume can contain at the maximum, which can be expressed in RH %.

The terms weight average molecular weight ($M_w$) and number average molecular weight ($M_n$) as used herein may be measured using GPC (gel permeation chromatography), and specifically may be measured according to the following physical property measurement method. Also, the term polydispersity index (PDI) as used herein is a value ($M_w/M_n$) obtained by dividing the weight average molecular weight ($M_w$) by the number average molecular weight ($M_n$), which means distribution of molecular weights of a polymer. Specifically, the number average molecular weight ($M_n$) and the weight average molecular weight ($M_w$) may be measured by placing an analyte in a 20 mL vial, diluting it in a THF (tetrahydrofuran) solvent to a concentration of about 20 mg/mL, and then filtering the standard sample for calibration and the sample to be analyzed through a syringe filter (pore size: 0.2 μm). In addition, as the analysis program, Agilent technologies' ChemStation may be used, and the number average molecular weight ($M_n$) and weight average molecular weight ($M_w$) may be obtained by comparing the elution time of the sample with the calibration curve. Here, the polydispersity index (PDI) may be a value obtained by dividing the measured weight average molecular weight ($M_w$) by the number average molecular weight ($M_n$).

<GPC Measurement Conditions>

Instrument: Agilent technologies' 1200 series

Column: using Agilent technologies' TL Mix. A & B

Solvent: THF

Column temperature: 40° C.

Sample concentration: 20 mg/mL, 10 μl injection

Using MP: 364000, 91450, 17970, 4910 and 1300 as standard samples

The term viscosity as used herein may be a value measured at room temperature, and specifically may be measured according to the following viscosity measurement method.

[Viscosity Measurement Method]

The viscosity of the curable composition may be measured using a viscometer (manufacturer: Brookfield, model name: Brookfield AMETEK/DV3T) and a spindle 63, and after performing zero adjustment of the viscometer, the spindle was mounted on the spindle connection part of the viscometer. A plate was mounted on the plate connection part of the viscometer and adjusted so as to form a certain gap between the spindle and the plate through an adjustment lever. The plate was separated and 0.5 mL or so of a measurement target (e.g., a curable composition or an acrylic polymeric component, etc.) was applied to the center of the separated plate. The plate applied with the measurement target was mounted again on the plate connection part of the viscometer, and after waiting until the torque value became 0, the viscosity was measured at about 25° C. and a rotation speed of 15 rpm.

The term thermal conductivity as used herein may be measured, in a state where a curable composition is prepared as a sample (cured product) with a diameter of 2 cm or more and a thickness of 500 μm, according to ASTM D5470 standard or ISO 22007-2 standard along the thickness direction of the sample. The term excellent thermal conductivity (or excellent heat conductivity) as used herein may mean that the thermal conductivity measured according to the above measurement method is about 1.2 W/mK or more, 1.3 W/mK or more, 1.4 W/mK or more, 1.5 W/mK or more, 1.6 W/mK or more, 1.7 W/mK or more, 1.8 W/mK or more, 1.9 W/mK or more, 2.0 W/mK or more, 2.1 W/mK or more, 2.2 W/mK or more, 2.3 W/mK or more, 2.4 W/mK or more, 2.5 W/mK or more, 2.6 W/mK or more, 2.7 W/mK or more, 2.8 W/mK or more, 2.9 W/mK or more, or 3.0 W/mK or more.

The term substitution as used herein means that a hydrogen atom bonded to a carbon atom of a compound is changed to another substituent, where the position to be substituted is not particularly limited as long as it is a position in which the hydrogen atom is substituted, that is, a position in which the substituent is substitutable, and when two or more substituents are substituted, the substituents may be the same as or different from each other.

The term substituent as used herein means an atom or atomic group that replaces one or more hydrogen atoms on the parent chain of a hydrocarbon. In addition, the substituent is described below, but is not limited thereto, and the substituent may be further substituted with the substituent described below or may not be substituted with any substituent, unless otherwise specified herein.

The term alkyl group or alkylene group as used herein may be a linear or branched alkyl group or alkylene group with 1 to 20 carbon atoms, or 1 to 16 carbon atoms, or 1 to 12 carbon atoms, or 1 to 8 carbon atoms, or 1 to 6 carbon atoms, or a cyclic alkyl group or alkylene group with 3 to 20 carbon atoms, or 3 to 16 carbon atoms, or 3 to 12 carbon atoms, or 3 to 8 carbon atoms, or 3 to 6 carbon atoms, unless otherwise described. Here, the cyclic alkyl group or alkylene group also includes an alkyl group or alkylene group having only a ring structure, and an alkyl group or alkylene group including a ring structure. For example, both a cyclohexyl group and a methyl cyclohexyl group correspond to the cyclic alkyl group. Also, for example, for example, the alkyl group or alkylene group may be exemplified by, specifically, methyl(ene), ethyl(ene), n-propyl(ene), isopropyl(ene), n-butyl(ene), isobutyl(ene), tert-butyl(ene), sec-butyl(ene), 1-methyl-butyl(ene), 1-ethyl-butyl(ene), n-pentyl(ene), isopentyl(ene), neopentyl(ene), tert-pentyl(ene), n-hexyl(ene), 1-methylpentyl(ene), 2-methylpentyl(ene), 4-methyl-2-pentyl(ene), 3,3-dimethylbutyl(ene), 2-ethylbutyl(ene), n-heptyl (ene), 1-methylhexyl(ene), n-octyl(ene), tert-octyl(ene), 1-methylheptyl(ene), 2-ethylhexyl(ene), 2-propylpentyl (ene), n-nonyl(ene), 2,2-dimethylheptyl(ene), 1-ethylpropyl (ene), 1,1-dimethylpropyl(ene), isohexyl(ene), 2-methylpentyl(ene), 4-methylhexyl(ene), 5-methylhexyl(ene), and the like, but is not limited thereto. In addition, the cycloalkyl group or cycloalkylene group may be exemplified by, specifically, cyclopropyl(ene), cyclobutyl(ene), cyclopentyl (ene), 3-methylcyclopentyl(ene), 2,3-dimethylcyclopentyl (ene), cyclohexyl(ene), 3-methylcyclohexyl(ene), 4-methylcyclohexyl(ene), 2,3-dimethylcyclohexyl(ene), 3,4,5-trimethylcyclohexyl(ene), 4-tert-butylcyclohexyl (ene), cycloheptyl(ene), cyclooctyl(ene), and the like, but is not limited thereto.

The term alkenyl group or alkenylene group as used herein may be a linear or branched acyclic alkenyl group or alkenylene group with 2 to 20 carbon atoms, or 2 to 16 carbon atoms, or 2 to 12 carbon atoms, or 2 to 8 carbon atoms, or 2 to 6 carbon atoms; or a cyclic alkenyl group or alkenylene group with 3 to 20 carbon atoms, or 3 to 16 carbon atoms, or 3 to 12 carbon atoms, or 3 to 8 carbon atoms, or 3 to 6 carbon atoms, unless otherwise described. Here, when an alkenyl group or alkenylene group with a ring structure is included, it corresponds to a cyclic alkenyl group or alkenylene group. Also, for example, it may be exemplified by ethenyl(ene), n-propenyl(ene), isopropenyl(ene), n-butenyl(ene), isobutenyl(ene), tert-butenyl(ene), sec-butenyl(ene), 1-methyl-butenyl(ene), 1-ethyl-butenyl(ene), n-pentenyl(ene), isopentenyl(ene), neopentenyl(ene), tert-pentenyl(ene), n-hexenyl(ene), 1-methylpentenyl(ene), 2-methylpentenyl(ene), 4-methyl-2-pentenyl(ene), 3,3-dimethylbutenyl(ene), 2-ethylbutenyl(ene), n-heptenyl(ene), 1-methylhexenyl(ene), n-octenyl(ene), tert-octenyl(ene), 1-methylheptenyl(ene), 2-ethylhexenyl(ene), 2-propylpentenyl(ene), n-nonylenenyl(ene), 2,2-dimethylheptenyl(ene), 1-ethylpropenyl(ene), 1,1-dimethylpropenyl(ene), isohexenyl(ene), 2-methylpentenyl(ene), 4-methylhexenyl(ene), 5-methylhexenyl(ene), and the like, but is not limited thereto. In addition, the cycloalkenyl group or cycloalkenylene group may be exemplified by, specifically, cyclopropenyl(ene), cyclobutenyl(ene), cyclopentenyl(ene), 3-methylcyclopentenyl(ene), 2,3-dimethylcyclopentenyl (ene), cyclohexenyl(ene), 3-methylcyclohexenyl(ene), 4-methylcyclohexenyl(ene), 2,3-dimethylcyclohexenyl (ene), 3,4,5-trimethylcyclohexenyl(ene), 4-tert-butylcyclohexenyl(ene), cycloheptenyl(ene), cyclooctenyl(ene), and the like, but is not limited thereto.

The term alkynyl group or alkynylene group as used herein may be a linear or branched acyclic alkynyl group or alkynylene group with 2 to 20 carbon atoms, or 2 to 16 carbon atoms, or 2 to 12 carbon atoms, or 2 to 8 carbon atoms, or 2 to 6 carbon atoms, unless otherwise described. Here, when an alkynyl group or alkynylene group with a ring structure is included, it corresponds to a cyclic alkynyl group or alkynylene group. Also, for example, it may be exemplified by ethynyl(ene), n-propynyl(ene), isopropynyl (ene), n-butynyl(ene), isobutynyl(ene), tert-butynyl(ene), sec-butynyl(ene), 1-methyl-butynyl(ene), 1-ethyl-butynyl (ene), n-pentynyl(ene), isopentynyl(ene), neopentynyl(ene), tert-pentynyl(ene), n-hexynyl(ene), 1-methylpentynyl(ene), 2-methylpentynyl(ene), 4-methyl-2-pentynyl(ene), 3,3-dimethylbutynyl(ene), 2-ethylbutynyl(ene), n-heptynyl(ene), 1-methylhexynyl(ene), n-octynyl(ene), tert-octynyl(ene), 1-methylheptynyl(ene), 2-ethylhexynyl(ene), 2-propylpentynyl(ene), n-nonynyl(ene), 2,2-dimethylheptynyl(ene), 1-ethylpropynyl(ene), 1,1-dimethylpropynyl(ene), isohexynyl(ene), 2-methylpentynyl(ene), 4-methylhexynyl(ene), 5-methylhexynyl(ene), and the like, but is not limited thereto.

The alkyl group, alkylene group, alkenyl group, alkenylene group, alkynyl group and alkynylene group may also be optionally substituted with one or more substituents. In this case, the substituent may be one or more selected from the group consisting of halogen (chlorine (Cl), iodine (I), bromine (Br), fluorine (F)), an aryl group, a heteroaryl group, an epoxy group, an alkoxy group, a cyano group, a carboxyl group, an acryloyl group, a methacryloyl group, an acryloyloxy group, a methacryloyloxy group, a carbonyl group and a hydroxy group, but is not limited thereto.

The term aryl group as used herein means an aromatic ring in which one hydrogen is removed from an aromatic hydrocarbon ring, where the aromatic hydrocarbon ring may include a monocyclic or polycyclic ring. The aryl group does not have a particularly limited number of carbon atoms, but may be an aryl group with 6 to 30 carbon atoms, or 6 to 26 carbon atoms, or 6 to 22 carbon atoms, or 6 to 20 carbon atoms, or 6 to 18 carbon atoms, or 6 to 15 carbon atoms, unless otherwise described. In addition, the term arylene group as used herein means that the aryl group has two bonding positions, that is, a divalent group. The description of the aryl group as described above may be applied, except that these are each a divalent group. The aryl group may be exemplified by, for example, a phenyl group, a phenylethyl group, a phenylpropyl group, a benzyl group, a tolyl group, a xylyl group or a naphthyl group, and the like, but is not limited thereto.

The term heteroaryl group as used herein is an aromatic ring containing one or more heteroatoms other than carbon, which may contain, specifically, one or more heteroatoms selected from the group consisting of nitrogen (N), oxygen (O), sulfur (S), selenium (Se) and tellurium (Te). In this case, the atoms constituting the ring structure of the heteroaryl group may be referred to as ring atoms. In addition, the heteroaryl group may include a monocyclic or polycyclic ring. The heteroaryl group does not have a particularly limited number of carbon atoms, but may be a heteroaryl group with 2 to 30 carbon atoms, or 2 to 26 carbon atoms, or 2 to 22 carbon atoms, or 2 to 20 carbon atoms, or 2 to 18 carbon atoms, or 2 to 15 carbon atoms, unless otherwise described. In another example, the heteroaryl group does not have a particularly limited number of ring atoms, but may be a heteroaryl group with 5 to 30, 5 to 25, 5 to 20, 5 to 15, 5 to 10, or 5 to 8 ring atoms. The heteroaryl group may be exemplified by, for example, a thiophene group, a furan group, a pyrrole group, an imidazolyl group, a thiazolyl group, an oxazolyl group, an oxadiazolyl group, a triazolyl group, a pyridyl group, a bipyridyl group, a pyrimidyl group, a triazinyl group, an acridyl group, a pyridazinyl group, a pyrazinyl group, a quinolinyl group, a quinazolinyl group, a quinoxalinyl group, a phthalazinyl group, a pyridopyrimidinyl group, a pyridopyrazinyl group, a pyrazinopyrazinyl group, an isoquinolinyl group, an indole group, a carbazolyl group, a benzoxazolyl group, a benzimidazolyl group, a benzothiazolyl group, a benzocarbazolyl group, a dibenzocarbazolyl group, a benzothiophene group, a dibenzothiophene group, a benzofuran group, a dibenzofuran group, a benzosilol group, a dibenzosilol group, a phenanthrolinyl group, an isoxazolyl group, a thiadiazolyl group, a phenothiazinyl group, a phenoxazine group and condensed structures thereof, and the like, but is not limited thereto.

In addition, the term heteroarylene group as used herein means that the heteroaryl group has two bonding positions, that is, a divalent group. The description of the heteroaryl group as described above may be applied, except that these are each a divalent group.

The aryl group or heteroaryl group may also be optionally substituted with one or more substituents. In this case, the substituent may be one or more selected from the group consisting of halogen (chlorine (Cl), iodine (I), bromine (Br), fluorine (F)), an aryl group, a heteroaryl group, an epoxy group, an alkoxy group, a cyano group, a carboxyl group, an acryloyl group, a methacryloyl group, an acryloyloxy group, a methacryloyloxy group, a carbonyl group and a hydroxy group, but is not limited thereto.

The term (meth)acrylate as used herein means acrylate and methacrylate, which specifically means acrylic acid, methacrylic acid, a derivative of acrylic acid, or a derivative of methacrylic acid.

The term (meth)acrylate as used herein may be represented by a compound represented by the following formula 1.

[Formula 1]

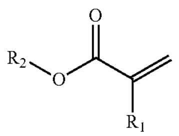

In Formula 1 above, $R_1$ may be hydrogen or an alkyl group having 1 to 20 carbon atoms. In addition, $R_2$ may be hydrogen or halogen (fluorine (F), chloro (Cl), iodine (I), bromo (Br)), an alkyl group unsubstituted or substituted with the aforementioned substituent, an alkenyl group unsubstituted or substituted with the aforementioned substituent, an alkynyl group unsubstituted or substituted with the aforementioned substituent, an aryl group unsubstituted or substituted with the aforementioned substituent, a heteroaryl group unsubstituted or substituted with the aforementioned substituent, or a hydroxy group.

In Formula 1, when $R_1$ is hydrogen and $R_2$ is hydrogen, it is acrylic acid, and when $R_1$ is a methyl group and $R_2$ is hydrogen, it is methacrylic acid.

Also, in Formula 1, when $R_1$ is hydrogen and $R_2$ is not hydrogen, it can be called an acrylic acid derivative; and when $R_1$ is a methyl group and $R_2$ is not hydrogen, it can be called a methacrylic acid derivative.

The compound of Formula 1 may be exemplified by, for example, (meth)acrylic acid; alkyl (meth)acrylates including methyl (meth)acrylate, ethyl (meth)acrylate, propyl (meth) acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, cyclohexyl (meth) acrylate, dicyclopentanyl (meth)acrylate, dicyclopentenyl (meth)acrylate, dicyclopentenyloxyethyl (meth)acrylate and stearyl (meth)acrylate; aryl (meth)acrylates including phenyl (meth)acrylate, 3-phenoxypropyl (meth)acrylate and nonylphenol ethylene oxide-modified (meth)acrylate; ether-based (meth)acrylates including methoxymethyl (meth) acrylate, ethoxymethyl (meth)acrylate, propoxymethyl (meth)acrylate, butoxymethyl (meth)acrylate, isobutoxymethyl (meth)acrylate, methoxyethyl (meth)acrylate, ethoxyethyl (meth)acrylate, oxiranyl (meth)acrylate, oxetanyl (meth)acrylate, tetrahydrofuranyl (meth)acrylate, tetrahydro-2H-pyranyl (meth)acrylate, oxiranylmethyl (meth) acrylate (or glycidyl (meth)acrylate), oxetanylethyl (meth) acrylate and tetrahydrofuranylmethyl (meth)acrylate (or tetrahydrofurfuryl (meth)acrylate); (meth)acrylates containing a hydroxy group including 2-hydroxyethyl (meth)acrylate, 2-hydroxypropyl (meth)acrylate, 3-hydroxypropyl (meth)acrylate, 4-hydroxybutyl (meth)acrylate, 2,3-dihydroxypropyl (meth)acrylate, 2,2-dihydroxyethyl (meth) acrylate, polyethylene glycol mono(meth)acrylate, polypropylene glycol mono(meth)acrylate, alkyloxypolyethylene glycol mono(meth)acrylate and alkyloxypolypropylene glycol mono(meth)acrylate, and the like, but is not limited thereto.

The term monomeric component as used herein means a component that a polymerizable monomer ratio is 55 wt % or more, 55 wt % or more, 65 wt % or more, 75 wt % or more, 85 wt % or more, 95 wt % or more, or 99 wt % or more, or it is 100 wt %, relative to the total weight. The upper limit of the polymerizable monomer ratio is not particularly limited, and, for example, the ratio may be 100 wt % or less or so.

The term acrylic monomeric component as used herein means a component that a content ratio of (meth)acrylate is 55 wt % or more, 55 wt % or more, 65 wt % or more, 75 wt % or more, 85 wt % or more, 95 wt % or more, or 99 wt % or more, or it is 100 wt %, relative to the total weight. The upper limit of the polymerizable monomer ratio is not particularly limited, and, for example, the ratio may be 100 wt % or less or so.

The term acrylic polymeric component as used herein means one formed by polymerization with a monomer mixture that a content ratio of the acrylic monomeric component is 55 wt % or more, 55 wt % or more, 65 wt % or more, 75 wt % or more, 85 wt % or more, 95 wt % or more, or 99 wt % or more, or it is 100 wt %, relative to the total weight. The upper limit of the acrylic monomeric component ratio is not particularly limited, and for example, the ratio may be 100 wt % or less or so.

Curable Composition

The curable composition according to one example of the present application may comprise a filler composition, an acrylic monomeric component and an acrylic polymeric component.

The term curable composition as used herein may comprise a component that can be converted into a resin through a curing reaction or a polymerization reaction, as well as a component generally known as a resin. In addition, the curable composition may be an adhesive composition, that is, an adhesive by itself, or a composition capable of forming an adhesive through a reaction such as a curing reaction.

Also, the curable composition may be a solvent-type curable composition, a water-based curable composition, or a solventless curable composition.

In addition, the curable composition may be an active energy ray (e.g., ultraviolet ray) curing type, a moisture curing type, a thermosetting type or a room temperature curing type, and preferably, the curable composition may be a room temperature curing type composition. When the curable composition is an active energy ray curing type, the curing of the curable composition is performed by irradiation with active energy rays such as ultraviolet rays; when it is a moisture curing type, the curing of the curable composition is performed by a method of maintaining it under appropriate moisture; when it is a thermosetting type, the curing of the curable composition is performed by a method of applying an appropriate heat; or when it is a room temperature curing type, the curing of the curable composition is performed by a method of maintaining the curable composition at room temperature.

In the curable composition according to one example of the present application, one or more selected from the group consisting of an acrylic monomeric component and polymerization units of an acrylic polymeric component may comprise a cyclic ether-based acrylic compound. Specifically, in the curable composition according to one example of the present application, the acrylic monomeric component may comprise a cyclic ether-based acrylic compound. Also, in the curable composition according to one example of the present application, the polymerization unit of the acrylic polymeric component may comprise a cyclic ether-based acrylic compound. In addition, in the curable composition according to one example of the present application, the acrylic monomeric component and polymerization units of the acrylic polymeric component may comprise a cyclic ether-based acrylic compound.

In the present application, the meaning that the polymerization unit of the acrylic polymeric component comprises a specific compound is that the acrylic polymeric component has been formed by polymerizing a monomer composition comprising a specific compound, which is, specifically, a meaning that as the polymerization unit of the acrylic polymeric component, the structure derived from the specific compound is included. That is, the meaning that the polymerization unit of the acrylic polymeric component comprises a cyclic ether-based acrylic compound is that the acrylic polymeric component has been formed by polymerizing a monomer composition comprising a cyclic ether-based acrylic compound, which is a meaning that as the polymerization unit, the structure derived from the cyclic ether-based acrylic compound is included.

Also, in the present application, the meaning that the polymerization unit of the acrylic polymeric component comprises a specific compound in a specific wt % is that the acrylic polymeric component has been formed by polymerizing a monomer composition comprising a specific compound in a specific wt %, which is, specifically, a meaning that as the polymerization unit of the acrylic polymeric component, the structure derived from the specific weight % of the specific compound is included. Furthermore, in the present application, the meaning of the total weight of the polymerization unit of the acrylic polymeric component may mean, when the acrylic polymeric component is formed by polymerizing a monomer composition comprising one or more compounds in each content ratio, the total weight of the monomer composition.

The curable composition according to one example of the present application may comprise the acrylic polymeric component in an amount of 2.5 wt % or more, 2.6 wt % or more, 2.7 wt % or more, 2.8 wt % or more, or 2.9 wt % or more relative to the total weight. Also, in another example, the curable composition may comprise the acrylic polymeric component in an amount of 5.5 wt % or less, 5.4 wt % or less, 5.3 wt % or less, 5.2 wt % or less, or 5.1 wt % or less relative to the total weight. The content ratio of the acrylic polymeric component in the curable composition may be within the range formed by appropriately selecting the upper and lower limits as listed above.

By comprising the acrylic polymeric component within the content ratio, the curable composition according to one example of the present application can form a cured product having excellent thermal conductivity and hardness.

The curable composition according to one example of the present application may comprise a filler composition in an amount of 1,000 parts by weight or more, 1,100 parts by weight or more, 1,200 parts by weight or more, 1,300 parts by weight or more, 1,400 parts by weight or more, 1,500 parts by weight or more, 1,600 parts by weight or more, or 1,700 parts by weight or more, relative to 100 parts by weight of the acrylic polymeric component. Also, in another example, the curable composition may comprise a filler composition in an amount of 6,000 parts by weight or less, 5,750 parts by weight or less, 5,500 parts by weight or less, 5,250 parts by weight or less, 5,000 parts by weight or less, 4,750 parts by weight or less, 4,500 parts by weight or less, 4,250 parts by weight or less, or 4,000 parts by weight or less, relative to 100 parts by weight of the acrylic polymeric component. The content ratio of the filler composition in the curable composition may be within the range formed by appropriately selecting the upper and lower limits as listed above.

By comprising the filler composition with the content ratio, the curable composition according to one example of the present application can form a cured product that thermal conductivity and insulating properties are secured, and can secure appropriate fluidity to improve workability of the curable composition.

The curable composition according to one example of the present application may comprise the acrylic monomeric component in an amount of 70 parts by weight or more, 75 parts by weight or more, 80 parts by weight or more, 85 parts by weight or more, 90 parts by weight or more, or 95 parts by weight or more, relative to 100 parts by weight of the acrylic polymeric component. Also, in another example, the curable composition may comprise the acrylic monomeric component in an amount of 380 parts by weight or less, 340 parts by weight or less, 300 parts by weight or less, 280 parts by weight or less, 260 parts by weight or less, or 240 parts by weight or less, relative to 100 parts by weight of the acrylic polymeric component. The content ratio of the acrylic monomeric component in the curable composition may be within the range formed by appropriately selecting the upper and lower limits as listed above.

By comprising the acrylic monomeric component within the content ratio, the curable composition according to one example of the present application can form a cured product having excellent hardness.

As one or more selected from the group consisting of an acrylic monomeric component and polymerization units of an acrylic polymeric component comprise a cyclic ether-based acrylic compound, the curable composition according to one example of the present application can exhibit quick curability at room temperature even in a state where the filler composition is included. In addition, even in a state where the filler composition is included in excess (70 wt % or more relative to the total weight), it is also possible to secure quick curability under room temperature and high humidity conditions.

The cyclic ether-based acrylic compound included in the curable composition according to one example of the present application may comprise a compound represented by the following formula 2. In addition, the cyclic ether-based acrylic compound included in the curable composition may comprise one or two or more compounds represented by the following formula 2.

[Formula 2]

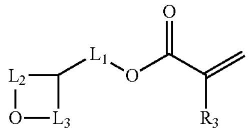

In Formula 2, $R_3$ may be hydrogen or an alkyl group having 1 to 20 carbon atoms. $L_1$ and $L_2$ may be each independently a single bond or an alkylene group. $L_3$ may be an alkylene group. Also, $L_1$ and $L_2$ may each independently be a single bond or an alkylene group having 1 to 20 carbon atoms. In addition, $L_3$ may be an alkylene group having 1 to 20 carbon atoms.

Preferably, $L_1$ may be a single bond or a linear or branched alkylene group having 1 to 8 carbon atoms, and more preferably, $L_1$ may be a linear or branched alkylene group having 1 to 4 carbon atoms.

Also, preferably, $L_2$ may be a single bond or a linear or branched alkylene group having 1 to 4 carbon atoms, and more preferably, $L_2$ may be a single bond.

Furthermore, preferably, $L_3$ may be a linear or branched alkylene group having 1 to 12 carbon atoms, and more preferably, $L_3$ may be a linear or branched alkylene group having 1 to 8 carbon atoms, or a linear or branched alkylene group having 1 to 4 carbon atoms.

In addition, in Formula 2, the sum of the numbers of carbon atoms present in $L_2$ and $L_3$ may be in a range of 1 to 8. The sum of the numbers of carbon atoms may be 7 or less, 6 or less, 5 or less, 4 or less, or 3 or less, or may be 1 or more, 2 or more, or 3 or more. The sum of the numbers of carbon atoms in $L_2$ and $L_3$ is the number of carbon atoms of the alkylene group of $L_3$ when $L_3$ is an alkylene group and $L_2$ is a single bond, and the sum of the number of carbon atoms of the alkylene group of $L_3$ and the number of carbon atoms of the alkylene group of $L_2$ when $L_3$ is an alkylene group and $L_2$ is also an alkylene group. In addition, when a substituent exists in the alkylene group, the number of carbon atoms present in the substituent is not included in the sum.

The compound represented by Formula 2 above is, for example, oxiranyl (meth)acrylate, oxetanyl (meth)acrylate, tetrahydrofuranyl (meth)acrylate, tetrahydro-2H-pyranyl (meth)acrylate, oxiranylmethyl (meth)acrylate (or glycidyl (meth)acrylate), oxetanylethyl (meth)acrylate and tetrahydrofuranylmethyl (meth)acrylate (or tetrahydrofurfuryl (meth)acrylate), and the like.

Also, the cyclic ether-based acrylic compound included in the curable composition according to one example of the present application may comprise the compound represented by Formula 2 above in an amount of 55 wt % or more, 60 wt % or more, 65 wt % or more, 70 wt % or more, 75 wt % or more, 80 wt % or more, 85 wt % or more, 90 wt % or more, 95 wt % or more, or 100 wt %, relative to the total weight of the cyclic ether-based acrylic compound.

The curable composition according to one example of the present application may comprise a filler composition, as described above. In the filler composition, the type, shape and size thereof, and the like are not particularly limited. Also, the filler composition may comprise one or more filler particles. Furthermore, even though the same type of filler particles is used, the filler composition may be one that particles having different shapes are mixed, and may also be one that particles having different particle average particle diameters are mixed. For example, the filler composition may be one that aluminum hydroxide and aluminum oxide (alumina) are mixed, where the shapes and average particle diameters of the aluminum hydroxide and aluminum oxide may be different from each other.

The filler composition included in the curable composition according to one example of the present application may comprise filler particles having a particle average particle diameter of 70 μm or more. In another example, the particle average particle diameter of the filler may be 75 μm or more, 80 μm or more, 85 μm or more, 90 μm or more, 95 μm or more, 100 μm or more, 105 μm or more, 110 μm or more, 115 μm or more, or 120 μm or more, or may have a size of above that. The filler particles having the particle average particle diameter in the above range may be referred to as A filler particles in the present application, where the A filler particles are not particularly limited in terms of the type and number as long as the particle average particle diameter is 70 μm or more.

The term particle average particle diameter of the filler particles as used herein is a so-called D50 particle diameter (median particle diameter), which may mean a particle diameter at 50% cumulative on the basis of the volume of the particle size distribution. That is, the particle diameter at the point where the particle size distribution is obtained on the basis of the volume and the cumulative value becomes 50% on the cumulative curve with 100% of the total volume can be regarded as the average particle diameter. Such a D50 particle diameter may be measured by a laser diffraction method.

The shape of the filler particles having a particle average particle diameter of 70 μm or more may be appropriately selected from a spherical shape and/or a non-spherical shape (e.g., needle shape and plate shape, etc.) as needed, and used, but is not limited thereto.

The matter that the term spherical shape of the filler particles as used herein may mean that the sphericity is about 0.9 or more, and the non-spherical shape may mean that the sphericity is less than about 0.9.

The sphericity can be confirmed through a particle shape analysis of the filler. Specifically, the sphericity of the filler, which is a three-dimensional particle, may be defined as a ratio (S'/S) of the surface area (S') of a sphere having the same volume as that of a particle to the surface area (S) of the particle. For real particles, circularity is generally used. The circularity is expressed as a ratio of the boundary of a circle having the same image and the same area (A) as a two-dimensional image of a real particle thus obtained to the boundary (P) of the image, which is obtained by the following equation.

$$\text{Circularity}=4\pi A/P^2$$ <Circularity equation>

The circularity is expressed as a value from 0 to 1, where a perfect circle has a value of 1, and as a particle has an irregular shape, it has a value lower than 1. The sphericity value in the present application may be measured as an average value of circularity measured with Marvern's particle shape analysis equipment (FPIA-3000).

The filler composition included in the curable composition according to one example of the present application may comprise A filler particles having a particle average particle diameter of 70 μm or more in an amount of 10 wt % or more, 15 wt % or more, 20 wt % or more, 25 wt % or more, 30 wt % or more, or 35 wt % or more, relative to the total weight of the filler composition. Also, in another example, the filler composition may comprise the A filler particles having a particle average particle diameter of 70 μm or more in an amount of 100 wt % or less, 99.5 wt % or less, 90 wt % or less, 80 wt % or less, 70 wt % or less, 60 wt % or less, 50 wt % or less, or 40 wt % or less. The filler particles having a particle average particle diameter of 70 μm or more may be included within the range formed by appropriately selecting the upper and lower limits as listed above.

The filler composition included in the curable composition according to one example of the present application may comprise filler particles having a particle average particle diameter of 20 μm or more, 25 μm or more, 30 μm or more, 35 μm or more, 40 μm or more, 45 μm or more, or 50 μm or more. Also, in another example, the filler composition may comprise filler particles having a particle average particle diameter of less than 70 μm, 65 μm or less, 60 μm or less, 55 μm or less, or 50 μm or less. The filler particles having a particle average particle diameter in the above range may be referred to as B filler particles in the present application. The B filler particles are not particularly limited with respect to the type and number as long as the particle average particle diameter satisfies the above range.

The filler composition included in the curable composition according to one example of the present application may comprise the B filler particles in an amount of 5 wt % or more, 10 wt % or more, 15 wt % or more, or 20 wt % or more, relative to the total weight of the filler composition, and in another example, it may comprise them in an amount of 100 wt % or less, 90 wt % or less, 80 wt % or less, 70 wt % or less, 60 wt % or less, 50 wt % or less, 40 wt % or less, or 30 wt % or less. The B filler particles may be included within the range formed by appropriately selecting the upper and lower limits as listed above.

In addition, the filler composition included in the curable composition according to one example of the present application may comprise A filler particles and B filler particles.

When the filler composition included in the curable composition according to one example of the present application comprises A filler particles and B filler particles, the curable composition may comprise the B filler particles in an amount of 10 parts by weight or more, 15 parts by weight or more, 20 parts by weight or more, 25 parts by weight or more, 30 parts by weight or more, 35 parts by weight or more, 40 parts by weight or more, or 45 parts by weight or more, relative to 100 parts by weight of the A filler particles. Also, in another example, the curable composition may comprise the B filler particles in an amount of 200 parts by weight or less, 180 parts by weight or less, 160 parts by weight or less, 140 parts by weight or less, 120 parts by weight or less, 100 parts by weight or less, 80 parts by weight or less, relative to 100 parts by weight of the A filler particles. In addition, if the content ratio of the A filler and B filler particles in the filler composition is adjusted as in the above range, it is possible to form a curable composition having an appropriate viscosity, and it is possible to form a cured product having excellent thermal conductivity.

When the filler composition included in the curable composition according to one example of the present application comprises A filler particles and B filler particles, the ratio ($D_A/D_B$) of the diameter ($D_A$) of the A filler particles to the diameter ($D_B$) of the B filler particles may be 1.05 or more, 1.1 or more, 1.15 or more, 1.2 or more, 1.25 or more, 1.3 or more, 1.35 or more, or 1.4 or more, and in another example, the ratio ($D_A/D_B$) may be 2.3 or less, 2.25 or less, 2.2 or less, 2.15 or less, 2.1 or less, 2.0 or less, 1.9 or less, 1.8 or less, 1.7 or less, 1.6 or less, 1.5 or less, or 1.4 or less. The ratio ($D_A/D_B$) of the diameter ($D_A$) of the A filler particles to the diameter ($D_B$) of the B filler particles may be included within the range formed by appropriately selecting the upper and lower limits as listed above. In addition, when the ratio ($D_A/D_B$) of the diameter ($D_A$) of the A filler particles to the diameter ($D_B$) of the B filler particles satisfies the above range, it is possible to ensure quick curability of the curable composition.

The filler composition included in the curable composition according to one example of the present application may comprise filler particles having a particle average particle diameter of less than 20 μm, 17.5 μm or less, 15 μm or less, 12.5 μm or less, 10 μm or less, 7.5 μm or less, 5 μm or less, 2.5 μm or less, or 1 μm or less. In another example, the filler composition may comprise filler particles having a particle average particle diameter of 0.01 μm or more, 0.05 μm or more, 0.1 μm or more, 0.2 μm or more, 0.4 μm or more, 0.8 μm or more, or 1 μm or more. The filler particles having the particle average particle diameter in the above range may be referred to as C filler particles in the present application. The C filler particles are not particularly limited with respect to the type and number as long as the particle average particle diameter satisfies the above range.

The filler composition included in the curable composition according to one example of the present application may comprise one or more selected from the group consisting of A filler particles, B filler particles and C filler particles. In addition, the filler composition included in the curable composition according to one example of the present application may comprise one or more selected from the group consisting of A filler particles and B filler particles, and C filler particles.

When the filler composition included in the curable composition according to one example of the present application comprises A filler particles and C filler particles, the curable composition may comprise the C filler particles in an amount of 50 parts by weight or more, 60 parts by weight or more, 70 parts by weight or more, 80 parts by weight or more, 90 parts by weight or more, or 100 parts by weight or more, relative to 100 parts by weight of the A filler particles. Also, in another example, the curable composition may comprise the C filler particles in an amount of 300 parts by weight or less, 280 parts by weight or less, 260 parts by weight or less, 240 parts by weight or less, 220 parts by weight or less, or 200 parts by weight or less, relative to 100 parts by weight of the A filler particles. The C filler particles may be included within the range formed by appropriately selecting the above-listed upper and lower limits relative to 100 parts by weight of the A filler particles.

When the filler composition included in the curable composition according to one example of the present application comprises A filler particles and C filler particles, the ratio ($D_A/D_C$) of the diameter ($D_A$) of the A filler particles to the diameter ($D_C$) of the C filler particles may be 2.5 or more, 4 or more, 10 or more, 15 or more, 20 or more, 25 or more, 30 or more, 35 or more, or 40 or more, and in another example, the ratio ($D_A/D_C$) may be 20,000 or less, 10,000 or less, 5,000 or less, 2,000 or less, 1,000 or less, 500 or less, 100 or less, 80 or less, 60 or less, 50 or less, or 45 or less. The ratio ($D_A/D_C$) of the diameter ($D_A$) of the A filler particles to the diameter ($D_C$) of the C filler particles may be included within the range formed by appropriately selecting the upper and lower limits as listed above. In addition, when the ratio ($D_A/D_C$) of the diameter ($D_A$) of the A filler particles to the diameter ($D_C$) of the C filler particles satisfies the above range, it is possible to ensure quick curability of the curable composition.

When the curable composition according to one example of the present application comprises the filler composition in the above content ratio according to the particle average size or satisfies the above-described diameter ratio, excellent thermal conductivity of the cured product as well as quick curability of the curable composition can be secured.

The filler composition included in the curable composition according to one example of the present application may be a thermally conductive filler composition for treating heat generated from a battery and the like, and may comprise at least one or more thermally conductive filler particles. In the thermally conductive filler particles, their own thermal conductivity may be about 1 W/mK or more, 5 W/mK or more, 10 W/mK or more, or 15 W/mK or more, and in another example, it may be about 400 W/mK or less, about 350 W/mK or less, or about 300 W/mK or less. The thermal conductivity of the thermally conductive filler particles that may be included in the filler composition is not particularly limited, but may be a value measured according to ASTM E1461.

The type of the thermally conductive filler particles included in the filler composition is not particularly limited as long as the above-described own thermal conductivity satisfies the above range, but it may be, for example, oxides such as aluminum oxide (alumina), magnesium oxide, beryllium oxide or titanium oxide; nitrides such as boron nitride, silicon nitride or aluminum nitride; carbides such as silicon carbide; hydrated metals such as aluminum hydroxide or magnesium hydroxide; metal fillers such as copper, silver, iron, aluminum or nickel; metal alloy fillers such as titanium; or a mixture thereof, and the like.

The filler composition included in the curable composition according to one example of the present application may comprise filler particles having Mohs hardness of 6 or more, 6.5 or more, 7 or more, 7.5 or more, 8 or more, or 8.5 or more. The term Mohs hardness as used herein may be measured using a Mohs scale. In addition, the filler particles having Mohs hardness in the above range may be referred to as first filler particles in the present application.

The first filler particles may be included in an amount of 30 wt % or more, 35 wt % or more, 40 wt % or more, 45 wt % or more, 50 wt % or more, 55 wt % or more, 60 wt % or more, 65 wt % or more, 70 wt % or more, 75 wt % or more, 80 wt % or more, 85 wt % or more, or 90 wt % or more, relative to the total weight of the filler composition, and in another example, they may be included in an amount of 100 wt % or less, 97.5 wt % or less, 95 wt % or less, or 92.5 wt % or less, relative to the total weight of the filler composition. The first filler particles may be included within the range formed by appropriately selecting the upper and lower limits as listed above.

Also, in the filler composition included in the curable composition according to one example of the present application, the filler particles having a particle average particle diameter of 70 μm or more (i.e., the aforementioned A filler particles) may comprise filler particles having Mohs hardness of 6 or more, 6.5 or more, 7 or more, 7.5 or more, 8 or more, or 8.5 or more (i.e., the aforementioned first filler particles). At this time, the A filler particles may comprise the first filler particles in an amount of 55 wt % or more, 75 wt % or more, or 95 wt % or more, relative to the total weight of the A filler particles.

Furthermore, in the filler composition included in the curable composition according to one example of the present application, the filler particles having a particle average particle diameter of less than 20 μm (i.e., the aforementioned C filler particles) may also comprise filler particles having Mohs hardness of 6 or more, 6.5 or more, 7 or more, 7.5 or more, 8 or more, or 8.5 or more. At this time, the C filler particles may comprise the first filler particles in an amount of 55 wt % or more, 75 wt % or more, or 95 wt % or more, relative to the total weight of the C filler particles.

In addition, the filler composition included in the curable composition may further comprise filler particles having Mohs hardness of less than 6, 5.5 or less, 5 or less, 4.5 or less, 4 or less, 3.5 or less, or 3 or less in order to adjust the viscosity, processability and hardness after curing of the curable composition. The filler particles having Mohs hardness within the above range may be referred to as second filler particles in the present application.

The second filler particles may be included in an amount of 50 parts by weight or less, 45 parts by weight or less, 40 parts by weight or less, 35 parts by weight or less, 30 parts by weight or less, or 25 parts by weight or less, relative to 100 parts by weight of the first filler particles. In another example, the second filler particles may be included in an amount of 0.01 parts by weight or more, 0.05 parts by weight or more, 0.1 parts by weight or more, 1 part by weight or more, or 5 parts by weight or more, relative to 100 parts by weight of the first filler particles. The second filler particles may be included within the range formed by appropriately selecting the above-listed upper and lower limits relative to 100 parts by weight of the first filler particles.

Also, in the filler composition included in the curable composition according to one example of the present application, the filler particles having a particle average particle diameter of more than 20 μm to less than 70 μm (i.e., the aforementioned B filler particles) may comprise filler particles having Mohs hardness of less than 6, 5.5 or less, 5 or less, 4.5 or less, 4 or less, 3.5 or less, or 3 or less (i.e., the aforementioned second filler particles). In addition, the B filler particles may further comprise filler particles having Mohs hardness of 6 or more, 6.5 or more, 7 or more, 7.5 or more, 8 or more, or 8.5 or more (i.e., the aforementioned first filler particles). At this time, the B filler particles may comprise the second filler particles in an amount of 55 wt % or more, 75 wt % or more, or 95 wt % or more, relative to the total weight of the B filler particles.

The curable composition according to one example of the present application may comprise an acrylic monomeric component, as described above.

The acrylic monomeric component of the curable composition according to one example of the present application may comprise a cyclic ether-based acrylic compound, as described above. In addition, the cyclic ether-based acrylic compound included in the acrylic monomeric component may comprise one or two or more compounds represented by the following formula 2.

[Formula 2]

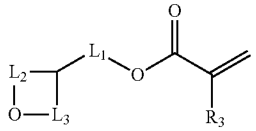

Since the contents of Formula 2 above are the same as described above, the detailed contents will be omitted.

The acrylic monomeric component of the curable composition according to one example of the present application may comprise the cyclic ether-based acrylic compound in an amount of 60 wt % or more, 65 wt % or more, 70 wt % or more, 75 wt % or more, 80 wt % or more, or 85 wt % or more, relative to the total weight of the acrylic monomeric component. In another example, the acrylic monomeric component of the curable composition may comprise the cyclic ether-based acrylic compound in an amount of 95 wt % or less, 92.5 wt % or less, 90 wt % or less, or 87.5 wt % or less, relative to the total weight of the acrylic monomeric component. The content range of the cyclic ether-based acrylic compound in the acrylic monomeric component may be included within the range formed by appropriately selecting the upper and lower limits as listed above. In addition, when the content range of the cyclic ether-based acrylic compound in the acrylic monomeric component satisfies the above range, it is possible to secure room temperature quick curability of the curable composition, where this room temperature quick curability can be secured even in a state where an excessive amount of fillers is present, and it is possible to make the cured product of the curable composition have excellent adhesive force.

The acrylic monomeric component of the curable composition according to one example of the present application may comprise substantially no aromatic compound. The aromatic compound may be one comprising an aryl (meth) acrylate, and in particular, may be a (meth)acrylate having a phenyl group, and the like. For example, the aromatic compound may be exemplified by phenyl (meth)acrylate, 2-hydroxy-3-phenoxypropyl (meth)acrylate, phenol ethylene oxide modified acrylate, para-cumyl ethylene oxide modified acrylate and nonyl phenol ethylene oxide-modified acrylate, and the like, but is not limited thereto.

The curable composition according to one example of the present application comprises substantially no aromatic compound, whereby the yellowing phenomenon can be suppressed even if the cured product of the curable composition is exposed to heat for a long period of time.

The term 'comprises substantially no' as used herein may mean that it is included in an amount of 10 wt % or less, 9 wt % or less, 8 wt % or less, 7 wt % or less, 6 wt % or less, 5 wt % or less, 4 wt % or less, 3 wt % or less, 2 wt % or less, 1 wt % or less, 0.5 wt % or less, 0.1 wt % or less, 0.05 wt % or less, 0.01 wt % or less, 0.005 wt % or less, 0.001 wt % or less, 0.0005 wt % or less, or 0.0001 wt % or less, relative to the total weight of the curable composition, or theoretically 0 wt %, in which it is not included at all.

The acrylic monomeric component of the curable composition according to one example of the present application may comprise a hydroxy group-containing acrylic compound. As the acrylic monomeric component comprises a hydroxy group-containing acrylic compound, it is possible to make the cured product of the curable composition have appropriate hardness so that it is not brittle and has flexibility. At this time, the appropriate hardness may mean a degree to which the cured product is not evaluated as being brittle, which will be described in detail below. In addition, as the acrylic monomeric component of the curable composition according to one example of the present application uses a hydroxy group-containing acrylic compound and a cyclic ether-based acrylic compound together, it is possible to provide a curable composition having more excellent thermal conductivity.

The hydroxy group-containing acrylic compound, which may be included in the acrylic monomeric component according to one example of the present application, may comprise a compound represented by the following formula 3. In addition, the hydroxy group-containing acrylic compound, which may be included in the acrylic monomeric component, may comprise one or two or more compounds represented by the following formula 3.

[Formula 3]

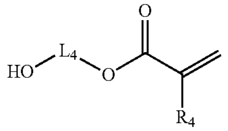

In Formula 3 above, $R_4$ may be hydrogen or an alkyl group having 1 to 20 carbon atoms. In addition, $L_4$ may be one selected from the group consisting of an alkylene group having 1 to 20 carbon atoms, an alkenylene group having 2 to 20 carbon atoms, an alkynylene group having 2 to 20 carbon atoms, an arylene group having 6 to 30 carbon atoms and a heteroarylene group having 5 to 30 ring atoms.

Preferably, $L_4$ may be a linear or branched alkylene group having 1 to 8 carbon atoms, and more preferably, $L_4$ may be a linear or branched alkylene group having 1 to 4 carbon atoms.

In addition, $L_4$ may be further substituted with a hydroxy group.

As the compound represented by Formula 3 above, there are, for example, 2-hydroxyethyl (meth)acrylate, 2-hydroxypropyl (meth)acrylate, 3-hydroxypropyl (meth)acrylate, 4-hydroxybutyl (meth)acrylate, 2,3-dihydroxypropyl (meth)acrylate (glyceryl mono(meth)acrylate), glyceryl poly (meth)acrylate, 2,2-dihydroxyethyl (meth)acrylate, polyethylene glycol mono(meth)acrylate and polypropylene glycol mono(meth)acrylate, and the like.

In addition, the hydroxy group-containing acrylic compound, which may be included in the acrylic monomeric component according to one example of the present application, may comprise the compound represented by Formula 3 above in an amount of 55 wt % or more, 60 wt % or more, 65 wt % or more, 70 wt % or more, 75 wt % or more, 80 wt % or more, 85 wt % or more, 90 wt % or more, 95 wt % or more, or 100 wt %, relative to the total weight of the hydroxy group-containing acrylic compound.

The acrylic monomeric component of the curable composition according to one example of the present application may comprise a cyclic ether-based acrylic compound and a hydroxy group-containing acrylic compound.

The acrylic monomeric component of the curable composition according to one example of the present application may comprise the hydroxy group-containing acrylic compound in an amount of 1 part by weight or more, 3 parts by weight or more, 5 parts by weight or more, 7 parts by weight or more, 9 parts by weight or more, or 11 parts by weight or more, relative to 100 parts by weight of the cyclic ether-based acrylic compound. In another example, the acrylic monomeric component of the curable composition may comprise the hydroxy group-containing acrylic compound in an amount of 18 parts by weight or less, 17.5 parts by weight or less, 17 parts by weight or less, 16.5 parts by weight or less, or 16 parts by weight or less, relative to 100 parts by weight of the cyclic ether-based acrylic compound. The content range of the hydroxy group-containing acrylic compound in the acrylic monomeric component may be included within the range formed by appropriately selecting the upper and lower limits as listed above. In addition, when the content range of the hydroxy group-containing acrylic compound in the acrylic monomeric component satisfies the above range, it is possible to obtain a cured product having appropriate hardness, and it is possible to make the curable composition have flexibility without brittleness even after it is cured.

In addition, the hydroxy group-containing acrylic compound, which may be included in the acrylic monomeric component according to one example of the present application, may have its own thermal conductivity of 0.15 W/mK or more, 0.2 W/mK or more, 0.25 W/mK or more, or 0.3 W/mK or more. By using the hydroxy group-containing acrylic compound that its own thermal conductivity satisfies the above range, it is possible to make the cured product of the curable composition have an excellent heat dissipation effect.

Here, the own thermal conductivity of the hydroxy group-containing acrylic compound is a value obtained by measuring the thermal conductivity of a cured product of the hydroxy group-containing acrylic compound, which was measured using a hot disk. Specifically, the thermal conductivity of the cured product of the hydroxy group-containing acrylic compound was measured in a state where the hydroxy group-containing acrylic compound was produced as a disk-type sample (cured product) having a diameter of 4 cm and a thickness of 500 μm according to ISO 22007-2 standard along the thickness direction of the sample.

The acrylic monomeric component of the curable composition according to one example of the present application may comprise a cyclic ether-based acrylic compound and acrylamide.

In addition, the acrylic monomeric component of the curable composition according to one example of the present application may comprise a cyclic ether-based acrylic compound, a hydroxy group-containing acrylic compound, and acrylamide.

The acrylic monomeric component of the curable composition according to one example of the present application may comprise acrylamide in an amount of 1 part by weight or more, 1.1 parts by weight or more, 1.2 parts by weight or more, 1.3 parts by weight or more, 1.4 parts by weight or more, or 1.5 parts by weight or more, relative to 100 parts by weight of the cyclic ether-based acrylic compound. In another example, the acrylic monomeric component of the curable composition may comprise acrylamide in an amount of 5 parts by weight or less, 4.5 parts by weight or less, 4 parts by weight or less, 3.5 parts by weight or less, 3 parts by weight or less, or 2.5 parts by weight or less, relative to 100 parts by weight of the cyclic ether-based acrylic compound. The content range of acrylamide in the acrylic monomeric component may be included within the range formed by appropriately selecting the upper and lower limits as listed above. In addition, when the content range of acrylamide in the acrylic monomeric component satisfies the above range, it is possible to make the cured product of the curable composition have improved stability, impact resistance and vibration resistance.

The acrylic monomeric component of the curable composition according to one example of the present application may comprise, if necessary, an additional acrylic compound in addition to the cyclic ether-based acrylic compound, the hydroxy group-containing acrylic compound, and acrylamide as described above. The additional acrylic compound may be a compound except for the cyclic ether-based acrylic compound, the hydroxy group-containing acrylic compound, and acrylamide among the compounds represented by Formula 1 above.

The curable composition according to one example of the present application may comprise an acrylic polymeric component, as described above. The acrylic polymeric component may comprise one or more polymerization units.

The polymerization unit of the acrylic polymeric component of the curable composition according to one example of the present application may comprise a cyclic ether-based acrylic compound, as described above. In addition, the cyclic ether-based acrylic compound included in the polymerization unit of the acrylic polymeric component may comprise one or two or more compounds represented by Formula 2 below.

[Formula 2]

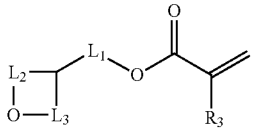

Since the contents of Formula 2 above are the same as described above, the detailed contents will be omitted.

The polymerization unit of the acrylic polymeric component of the curable composition according to one example of the present application may comprise the cyclic ether-based acrylic compound in an amount of 70 wt % or more, 75 wt % or more, 80 wt % or more, 85 wt % or more, or 90 wt % or more, relative to the total weight. In another example, the polymerization unit of the acrylic polymeric component of the curable composition may comprise the cyclic ether-based acrylic compound in an amount of 99 wt % or less, 97.5 wt % or less, 95 wt % or less, or 92.5 wt % or less, relative to the total weight. The content range of the cyclic ether-based acrylic compound in the polymerization unit of the acrylic polymeric component may be included within the range formed by appropriately selecting the upper and lower limits as listed above. In addition, when the content range of the cyclic ether-based acrylic compound in the polymerization unit of the acrylic polymeric component satisfies the above range, it is possible to secure room temperature quick curability of the curable composition, where this room temperature quick curability can be secured even in a state where an excessive amount of fillers is present, and it is possible to make the cured product of the curable composition have excellent adhesive force.

The polymerization unit of the acrylic polymeric component of the curable composition according to one example of the present application may comprise substantially no aromatic compound. The aromatic compound may be one comprising an aryl (meth)acrylate, and in particular, may be a (meth)acrylate having a phenol group, and the like. For example, the aromatic compound may be exemplified by phenyl (meth)acrylate, 2-hydroxy-3-phenoxypropyl (meth) acrylate, phenol ethylene oxide modified acrylate, para-cumyl ethylene oxide modified acrylate and nonyl phenol ethylene oxide-modified acrylate, and the like, but is not limited thereto. Here, the meaning that it comprises substantially no is the same as the above-described definition. The polymerization unit of the acrylic polymeric component comprises substantially no aromatic compound, whereby the yellowing phenomenon can be suppressed even if the cured product of the curable composition is exposed to heat for a long period of time.

The polymerization unit of the acrylic polymeric component of the curable composition according to one example of the present application may comprise a hydroxy group-containing acrylic compound. As the polymerization unit of the acrylic polymeric component comprises a hydroxy group-containing acrylic compound, it is possible to make the cured product of the curable composition have appropriate hardness so that it is not brittle and has flexibility. In addition, as the polymerization unit of the acrylic polymeric component of the curable composition according to one example of the present application uses a hydroxy group-containing acrylic compound and a cyclic ether-based acrylic compound together, it is possible to provide a curable composition having more excellent thermal conductivity.

The hydroxy group-containing acrylic compound included in the polymerization unit of the acrylic polymeric component of the curable composition according to one example of the present application may comprise a compound represented by the following formula 3. In addition, the hydroxy group-containing acrylic compound, which may be included in the polymerization unit of the acrylic polymeric component, may comprise one or two or more compounds represented by Formula 3 below.

[Formula 3]

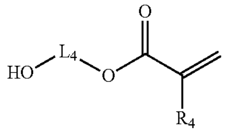

Since the contents of Formula 3 above are the same as described above, the detailed contents will be omitted.

The polymerization unit of the acrylic polymeric component of the curable composition according to one example of the present application may comprise a cyclic ether-based acrylic compound and a hydroxy group-containing acrylic compound.

The polymerization unit of the acrylic polymeric component of the curable composition according to one example of the present application may comprise the hydroxy group-containing acrylic compound in an amount of 0.1 parts by weight or more, 0.25 parts by weight or more, 0.5 parts by weight or more, 0.75 parts by weight or more, 1 part by weight or more, 1.25 parts by weight or more, 1.5 parts by weight or more, 1.75 parts by weight or more, 2 parts by weight or more, 2.25 parts by weight or more, 2.5 parts by weight or more, 2.75 parts by weight or more, 3 parts by weight or more, or 3.25 parts by weight or more, relative to 100 parts by weight of the cyclic ether-based acrylic compound. In another example, the polymerization unit of the acrylic polymeric component of the curable composition may comprise the hydroxy group-containing acrylic compound in an amount of 10 parts by weight or less, 9 parts by weight or less, 8 parts by weight or less, 7 parts by weight or less, 6 parts by weight or less, 5 parts by weight or less, or 4 parts by weight or less, relative to 100 parts by weight of the cyclic ether-based acrylic compound. The content range of the hydroxy group-containing acrylic compound in the polymerization unit of the acrylic polymeric component may be included within the range formed by appropriately selecting the upper and lower limits as listed above. In addition, when the content range of the hydroxy group-containing acrylic compound in the polymerization unit of the acrylic polymeric component satisfies the above range, it is possible to obtain a cured product having appropriate hardness, and it is possible to make the curable composition have flexibility without brittleness even after it is cured.

In addition, the hydroxy group-containing acrylic compound, which may be included in the polymerization unit of the acrylic polymeric component according to one example of the present application, may have its own thermal conductivity of 0.15 W/mK or more, 0.2 W/mK or more, 0.25 W/mK or more, or 0.3 W/mK or more. By using the hydroxy group-containing acrylic compound that its own thermal conductivity satisfies the above range, it is possible to make the cured product of the curable composition have an excellent heat dissipation effect. The own thermal conductivity of the hydroxy group-containing acrylic compound may be measured using the hot disk method as described above.

The polymerization unit of the acrylic polymeric component of the curable composition according to one example of the present application may comprise a cyclic ether-based acrylic compound and acrylamide.

In addition, the polymerization unit of the acrylic polymeric component of the curable composition according to one example of the present application may comprise a cyclic ether-based acrylic compound, a hydroxy group-containing acrylic compound, and acrylamide.

The polymerization unit of the acrylic polymeric component of the curable composition according to one example of the present application may comprise acrylamide in an amount of 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, 5 parts by weight or more, 5.5 parts by weight or more, 6 parts by weight or more, or 6.5 parts by weight or more, relative to 100 parts by weight of the cyclic ether-based acrylic compound. In another example, the polymerization unit of the acrylic polymeric component of the curable composition may comprise acrylamide in an amount of 30 parts by weight or less, 28 parts by weight or less, 26 parts by weight or less, 24 parts by weight or less, 22 parts by weight or less, 20 parts by weight or less, 18 parts by weight or less, 16 parts by weight or less, 14 parts by weight or less, 12 parts by weight or less, 10 parts by weight or less, or 8 parts by weight or less, relative to 100 parts by weight of the cyclic ether-based acrylic compound. The content range of acrylamide in the polymerization unit of the acrylic polymeric component may be included within the range formed by appropriately selecting the upper and lower limits as listed above. In addition, when the content range of acrylamide in the polymerization unit of the acrylic polymeric component satisfies the above range, it is possible to make the cured product of the curable composition have improved stability, impact resistance and vibration resistance.

The polymerization unit of the acrylic polymeric component of the curable composition according to one example of the present application may comprise, if necessary, an additional acrylic compound in addition to the cyclic ether-based acrylic compound, the hydroxy group-containing acrylic compound, and acrylamide as described above. The additional acrylic compound may be a compound except for the cyclic ether-based acrylic compound, the hydroxy group-containing acrylic compound, and acrylamide among the compounds represented by Formula 1 above.

The acrylic polymeric component of the curable composition according to one example of the present application may be formed by an acrylic polymerization precursor composition, and the polymerization unit of the acrylic polymeric component may be determined according to a chemical species included in the acrylic polymerization precursor composition.

The acrylic polymerization precursor composition forming the acrylic polymeric component of the curable composition according to one example of the present application may comprise a cyclic ether-based acrylic compound, where the type and content, and the like of the cyclic ether-based acrylic compound that may be included in the polymerization unit of the acrylic polymeric component as described above are the same, so that they will be omitted.

Also, the acrylic polymerization precursor composition forming the acrylic polymeric component of the curable composition according to one example of the present application may comprise a hydroxy group-containing acrylic compound, where the type and content, and the like of the hydroxy group-containing acrylic compound that may be included in the polymerization unit of the acrylic polymeric component as described above are the same, so that they will be omitted.

In addition, the acrylic polymerization precursor composition forming the acrylic polymeric component of the curable composition according to one example of the present application may comprise acrylamide, where the content and the like of the acrylamide that may be included in the polymerization unit of the acrylic polymeric component as described above are the same, so that they will be omitted.

The acrylic polymeric component of the curable composition according to one example of the present application may be formed by adding a polymerization initiator to the acrylic polymerization precursor composition and then initiating polymerization. The acrylic polymerization precursor composition may further comprise a molecular weight modifier.

The acrylic polymeric component of the curable composition according to one example of the present application may be formed through a polymerization reaction of an acrylic polymerization precursor composition to which a polymerization initiator is added. The polymerization temperature of the polymerization reaction may be 55° C. or higher, 56° C. or higher, 57° C. or higher, 58° C. or higher, 59° C. or higher, or 60° C. or higher without exceeding about 70° C. In addition, as the polymerization initiator, a peroxide compound, an azo compound or a redox agent may be used, and an appropriate polymerization initiator may be selected in consideration of the polymerization temperature. For example, the polymerization initiator is not particularly limited as long as it is used in the art, but 2,2'-azobisisobutylnitrile, 2,2'-azobis(4-methoxy-2,4-dimethylvaleronitrile) or a combination thereof, and the like may be used.

The acrylic polymerization precursor composition forming the acrylic polymeric component of the curable composition according to one example of the present application may comprise the polymerization initiator in an amount of 0.0001 wt % or more, 0.0005 wt % or more, 0.001 wt % or more, 0.0025 wt % or more, 0.005 wt % or more, 0.0075 wt % or more, or 0.01 wt %, relative to the total weight of the acrylic polymerization precursor composition. In another example, the acrylic polymerization precursor composition may comprise the polymerization initiator in an amount of 0.1 wt % or less, 0.075 wt % or less, 0.05 wt % or less, 0.025 wt % or less, or 0.02 wt % or less, relative to the total weight of the acrylic polymerization precursor composition. The content ratio of the polymerization initiator included in the acrylic polymerization precursor composition may be included within the range formed by appropriately selecting the upper and lower limits as listed above. When the content ratio of the polymerization initiator included in the acrylic polymerization precursor composition satisfies the above range, the acrylic polymeric component can be formed while maintaining polymerization stability as well as easily controlling the reaction.

In addition, in order to secure polymerization stability when the acrylic polymeric component is formed by polymerizing the acrylic polymerization precursor composition, the polymerization initiator may be divided 3 or more times, 4 or more times, or 5 or more times to be included in the acrylic polymerization precursor composition. For example, when 0.02 wt % or so of the polymerization initiator relative to the total weight of the acrylic polymerization precursor composition is introduced four times, 0.005 wt %, which is an amount corresponding to ¼, may be included in the acrylic polymerization precursor composition before polymerization is initiated, and after polymerization is initiated to form some cross-linked structures, the polymerization reaction may be completed by introducing 0.005 wt %, which is an amount corresponding to ¼, three times, and then further polymerizing them. When the polymerization initiator is introduced at once and polymerized, or divided into two and introduced, a target conversion rate must be achieved once or twice, so that an excessive amount of the polymerization initiator must be introduced, whereby it may be difficult to control the reaction.

The acrylic polymeric component of the curable composition according to one example of the present application may be formed through a polymerization reaction of an acrylic polymerization precursor composition that further comprises a molecular weight modifier in order to achieve a desired molecular weight in addition to the polymerization initiator.

The molecular weight modifier is not particularly limited as long as it can be used in the art, but includes, for example, alkyl mercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate) and pentaerythritol tetrakis-thiopropionate; α-methylstyrene dimers; terpinolene, and the like. It is preferable to use alkyl mercaptans in consideration of the availability of the molecular weight modifier, and one or a combination of two or more thereof may also be used.

The acrylic polymerization precursor composition forming the acrylic polymeric component of the curable composition according to one example of the present application may comprise the molecular weight modifier in an amount of 0.1 wt % or more, 0.5 wt % or more, 1 wt % or more, 2 wt % or more, 3 wt % or more, 4 wt % or more, or 5 wt % or more, relative to the total weight of the acrylic polymerization precursor composition. In another example, the acrylic polymerization precursor composition may comprise the molecular weight modifier in an amount of 10 wt % or less, 9 wt % or less, 8 wt % or less, 7 wt % or less, or 6 wt % or less, relative to the total weight of the acrylic polymerization precursor composition. The content ratio of the molecular weight modifier included in the acrylic polymerization precursor composition may be included within the range formed by appropriately selecting the upper and lower limits as listed above. When the content ratio of the molecular weight modifier included in the acrylic polymerization precursor composition satisfies the above range, it is possible to form an acrylic polymeric component having appropriate number average molecular weights and/or weight average molecular weights.

In the acrylic polymeric component of the curable composition according to one example of the present application, a glass transition temperature ($T_g$) measured using a differential scanning calorimeter (DSC) may be −50° C. or higher, −48° C. or higher, −46° C. or higher, −44° C. or higher, −42° C. or higher, or −40° C. or higher, and in another example, it may be 0° C. or lower, −2° C. or lower, −4° C. or lower, −6° C. or lower, −8° C. or lower, or −10° C. or lower.

In the acrylic polymeric component of the curable composition according to one example of the present application, a viscosity measured at room temperature may be 1,000 cP or more, 1,200 cP or more, 1,400 cP or more, 1,600 cP or more, or 1,800 cP or more, and in another example, the viscosity may be 6,000 cP or less, 5,900 cP or less, 5,800 cP or less, 5,700 cP or less, 5,600 cP or less, or 5,500 cP or less. The viscosity of the acrylic polymeric component may be a value measured at about 25° C. and a rotation speed of 15 rpm using a viscometer (manufacturer: Brookfield, model name: Brookfield AMETEK/DV3T) and a spindle 63 according to the method for measuring the viscosity as described above.

The acrylic polymeric component of the curable composition according to one example of the present application may have a weight average molecular weight ($M_w$) of 1,000 g/mol or more, 2,000 g/mol or more, 3,000 g/mol or more, 4,000 g/mol or more, 5,000 g/mol or more, 6,000 g/mol or more, or 7,000 g/mol or more as measured using GPC (gel permeation chromatography), and in another example, the acrylic polymeric component may have a weight average molecular weight ($M_w$) of 14,500 g/mol or less, 14,250 g/mol or less, 14,000 g/mol or less, 13,750 g/mol or less, 13,500 g/mol or less, 13,250 g/mol or less, or 13,000 g/mol or less as measured using GPC (gel permeation chromatography). The weight average molecular weight ($M_w$) of the acrylic polymeric component measured using GPC (gel permeation chromatography) may be included within the range formed by appropriately selecting the upper and lower limits as listed above. When the weight average molecular weight ($M_w$) of the acrylic polymeric component measured using GPC (gel permeation chromatography) satisfies the above range, it is possible to secure an appropriate curing rate of the curable composition, and it is possible to secure mixability with the filler (in particular, an excessive amount of filler) in the curable composition.

The curable composition according to one example of the present application may further comprise a peroxide compound, if necessary. The peroxide compound may be a material that initiates a polymerization reaction of the curable composition.

The peroxide compound may include, for example, ketone peroxide compounds such as methyl ethyl ketone peroxide (MEKP), cyclohexanone peroxide, 3,3,5-trimethylcyclohexanone peroxide, methylcyclohexanone peroxide, methylacetacetate peroxide and acetylacetone peroxide; hydroperoxide compounds such as tert-butyl hydroperoxide, cumene hydroperoxide, diisopropylbenzenehydrooxide, paramentane hydroperoxide, 2,5-dimethylhexane-2,5-dihydroperoxide and 1,1,3,3-tetramethylbutyl hydroperoxide; diacyl peroxide compounds such as acetyl peroxide, isobutyl peroxide, octanoyl peroxide, decanoyl peroxide, laurinoyl peroxide, 3,3,5-trimethylhexanoyl peroxide, succinic acid peroxide, benzoyl peroxide, 2,4-dichlorobenzoyl peroxide and meth-toluyl peroxide; acyl peroxide compounds such as benzoyl peroxide (BPO), but is not limited thereto. In addition, one or two or more of the peroxide compounds may be used.

The curable composition according to one example of the present application may comprise the peroxide compound in an amount of 1 part by weight or more, 2 parts by weight or more, 3 parts by weight or more, 4 parts by weight or more, 5 parts by weight or more, or 6 parts by weight or more, relative to 100 parts by weight of the acrylic polymeric component. In another example, the curable composition may comprise the peroxide compound in an amount of 10 parts by weight or less, 9 parts by weight or less, 8 parts by weight or less, or 7 parts by weight or less, relative to 100 parts by weight of the acrylic polymeric component. The content ratio of the peroxide compound included in the curable composition may be included within the range formed by appropriately selecting the upper and lower limits as listed above. When the content ratio of the peroxide compound included in the curable composition satisfies the above range, it is possible to form a curable composition in which sufficient curability and storage stability are ensured, and it is possible to form a cured product in which adequate adhesive force is ensured.

The curable composition according to one example of the present application may further comprise a metal catalyst, if necessary.

As the metal catalyst, an organic acid metal salt or an organic metal chelate may be used. The organic acid metal salt or organic metal chelate may be, for example, metal naphthalic acids such as cobalt naphthalic acid, copper naphthalic acid and manganese naphthalic acid; metal octenic acids such as cobalt octenate, copper octenate and manganese octenate; metal acetylacetates such as copper acetylacetate, titanium acetylacetate, manganese acetylacetate, chromium acetylacetate, iron acetylacetate, vanadinyl acetylacetate and cobalt acetylacetate, and the like. In addition, one or two or more of the metal catalysts may be used.

The curable composition according to one example of the present application may comprise the metal catalyst in an amount of 0.01 parts by weight or more, 0.05 parts by weight or more, 0.1 parts by weight or more, 0.2 parts by weight or more, or 0.3 parts by weight or more, relative to 100 parts by weight of the acrylic polymeric component. In another example, the curable composition may comprise the metal catalyst in an amount of 1 part by weight or less, 0.8 parts by weight or less, 0.6 parts by weight or less, or 0.4 parts by weight or less, relative to 100 parts by weight of the acrylic polymeric component. The content ratio of the metal catalyst included in the curable composition may be included within the range formed by appropriately selecting the upper and lower limits as listed above. When the content ratio of the metal catalyst included in the curable composition satisfies the above range, it is possible to form a curable composition in which sufficient curability and storage stability are ensured, and it is possible to form a cured product in which adequate adhesive force is ensured.

The curable composition according to one example of the present application may establish a room temperature initiation and curing system by a redox reaction by introducing a peroxide compound and a metal catalyst. In particular, considering the acrylic monomeric component comprising the cyclic ether-based acrylic compound, it is preferable to use a ketone peroxide compound as the peroxide compound and metal naphthenic acid as the metal catalyst.

The curable composition according to one example of the present application may further comprise a plasticizer, if necessary. The type of the plasticizer is not particularly limited, but for example, one or more of a phthalic acid compound, a phosphoric acid compound, an adipic acid compound, a sebacic acid compound, a citric acid compound, a glycolic acid compound, a trimellitic acid compound, a polyester compound, an epoxidized soybean oil, chlorinated paraffin, a chlorinated fatty acid ester, a fatty acid compound, a compound having a saturated aliphatic chain substituted with a sulfonic acid group to which a phenyl group is bonded (e.g., LANXESS' mesamoll) or a vegetable oil may be selected and used.

As the phthalic acid compound, one or more of dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate or n-decyl phthalate may be used. As the phosphoric acid compound, one or more of tricresyl phosphate, trioctyl phosphate, triphenyl phosphate, octyl diphenyl phosphate, cresyl diphenyl phosphate or trichloroethyl phosphate may be used. As the adipic acid compound, one or more of dibutoxyethoxyethyl adipate (DBEEA), dioctyl adipate, diisooctyl adipate, di-n-octyl adipate, didecyl adipate, diisononyl adipate (DINA), diisodecyl adipate (DIDP), n-octyl n-decyl adipate, n-heptyl adipate or n-nonyl adipate may be used. As the sebacic acid compound, one or more of dibutyl sebacate, dioctyl sebacate, diisooctyl sebacate or butyl benzyl may be used. As the citric acid compound, one or more of triethyl citrate, acetyl triethyl citrate, tributyl citrate, acetyl tributyl citrate or acetyl trioctyl citrate may be used. As the glycolic acid compound, one or more of methyl phthalyl ethyl glycolate, ethyl phthalyl ethyl glycolate or butyl phthalyl ethyl glycolate may be used. As the trimellitic acid compound, one or more of trioctyl trimellitate or tri-n-octyl n-decyl trimellitate may be used. The polyester compound may be a reaction product of a diol selected from butane diol, ethylene glycol, propane 1,2-diol, propane 1,3-diol, polyethylene glycol, or glycerol, and a diacid (selected from adipic acid, succinic acid and succinic anhydride) or a hydroxy acid (such as, hydroxystearic acid).

The curable composition according to one example of the present application may further comprise a dispersant, if necessary. The dispersant may improve dispersibility of the filler composition in the curable composition.

As the dispersant, for example, polyamideamines and their salts, polycarboxylic acids and their salts, modified polyurethanes, modified polyesters, modified poly(meth)acrylates, (meth)acrylic copolymers, naphthalenesulfonic acid formalin condensates, polyoxyethylene alkyl phosphate esters, polyoxyethylene alkylamines and pigment derivatives, and the like may be used, but any dispersant known in the art may be used without limitation.

The curable composition according to one example of the present application may further comprise a reaction accelerator, if necessary. The reaction accelerator may perform a function of accelerating the polymerization reaction of the curable composition. The type of the reaction accelerator is not particularly limited, but for example, one or more selected from the group consisting of amine-based compounds (N,N-dimethyl aniline and N,N-dimethyl-p-toluidine (DMPT), etc.), saccharin-based compounds and hydrazine-based compounds may be used.

The curable composition according to one example of the present application may comprise a viscosity modifier, for example, a thixotropic agent, a diluent, a surface treatment agent or a coupling agent, and the like, if necessary, for controlling the viscosity, for example, increasing or decreasing the viscosity, or for controlling the viscosity according to shear force. The thixotropic agent may adjust the viscosity of the curable composition according to shear force. The usable thixotropic agent may be exemplified by fumed silica and the like. The diluent is generally used to lower the viscosity of the curable composition, and as long as it may exhibit such an action, various types of diluents known in the art may be used without limitation. The surface treatment agent is for surface treatment of the filler composition introduced into the cured product of the curable composition, and as long as it may exhibit such an action, various types known in the art may be used without limitation. The coupling agent may be used, for example, to improve dispersibility of thermally conductive filler particles (e.g., alumina, etc.), as long as it may exhibit such an action, various types known in the art may be used without limitation.

The curable composition according to one example of the present application may further comprise a flame retardant or a flame retardant auxiliary agent, if necessary. The curable composition further comprising a flame retardant or a flame retardant auxiliary agent may be cured to form a flame retardant cured product. As the flame retardant, various known flame retardants may be applied without particular limitation, and for example, a flame retardant in the form of a solid filler or a liquid flame retardant may be applied. The flame retardant includes, for example, an organic flame retardant such as melamine cyanurate or an inorganic flame retardant such as magnesium hydroxide, but is not limited thereto. When the amount of thermally conductive filler particles included in the curable composition is large, a liquid type flame retardant material (TEP, triethyl phosphate or TCPP, tris(1,3-chloro-2-propyl)phosphate, etc.) may also be used. In addition, a silane coupling agent capable of acting as a flame retardant synergist may also be added.

The curable composition according to one example of the present application may be a one-component type or a two-component type. The term one-component type as used herein means a form capable of forming a cured product in a state where a main part and a curing agent part are mixed together, as known in the art. In addition, the term two-component type as used herein means a form in which a cured product can be formed by separating a main part and a curing agent part, and mixing and reacting them, as known therein.

In addition, when the curable composition according to one example of the present application is a two-component type, it may be distinguished into a main part and a curing agent part according to the types of additives. The main part may further comprise a peroxide compound, and the curing agent part may further comprise a metal catalyst.

Cured Product of Curable Composition

As described above, the curable composition according to one example of the present application may be an active energy ray (e.g., ultraviolet ray) curing type, moisture curing type, thermosetting type or room temperature curing type, and preferably, the curable composition may be a room temperature curing type composition.

The curable composition according to one example of the present application may be cured according to the above method to form a cured product, and may have at least one or more of the following physical properties. Each of the physical properties described below is independent, where any one physical property does not take precedence over the other properties, and the cured product of the curable composition may satisfy at least one or two or more of the physical properties described below. The cured product of the curable composition that satisfies at least one or two or more of the physical properties described below is caused by a combination of the respective components in the curable composition.

The curable composition according to one example of the present application may be cured suitably within 6 hours after initiation of curing at room temperature, where it may be evaluated that curing efficiency is excellent. In addition, the curable composition according to one example of the present application may have a ratio (Va/Vb) of a viscosity (Va) measured immediately after 4 hours have elapsed after curing initiation in a high humidity environment (about 70RH % or more) and at room temperature to a viscosity (Vb) measured on curing initiation of about 10,000 or more, where it may be evaluated that curing efficiency is excellent.

When the ratio (V1/V2) of the viscosity (V1) measured after curing to the viscosity (V2) measured on the curing initiation is about 10,000 or more, 10,500 or more, 11,000 or more, 11,500 or more, or 12,000 or more, it can be regarded that the curable composition according to one example of the present application is cured. Here, the time taken for curing to satisfy the ratio (V1/V2) can be regarded as the curing time. The curing time may be 6 hours or less, 5 hours or less, or 4 hours or less, as described above.

The curable composition according to one example of the present application may generate heat on curing. In order to prevent thermal damage to battery cells or electronic elements, and the like, to which the cured product of the curable composition can be applied, due to curing of the curable composition, it may be suitable that the exothermic temperature of the curable composition does not exceed about 50° C.

The cured product of the curable composition according to one example of the present application may have a thermal conductivity of about 1.2 W/mk or more as measured, in a state where the curable composition is prepared as a sample (cured product) having a diameter of 2 cm or more and a thickness of 500 μm, according to ASTM D5470 standard or ISO 22007-2 standard along the thickness direction of the sample. In another example, the thermal conductivity of the cured product of the curable composition may also be 1.3 W/mK or more, 1.4 W/mK or more, 1.5 W/mK or more, 1.6 W/mK or more, 1.7 W/mK or more, 1.8 W/mK or more, 1.9 W/mK or more, 2.0 W/mK or more, 2.1 W/mK or more, 2.2 W/mK or more, 2.3 W/mK or more, 2.4 W/mK or more, 2.5 W/mK or more, 2.6 W/mK or more, 2.7 W/mK or more, 2.8 W/mK or more, 2.9 W/mK or more, or 3.0 W/mK or more or so. As the thermal conductivity has a high value, it means high heat conductivity, so that the upper limit thereof is not particularly limited. For example, the thermal conductivity of the cured product of the curable composition may be 20 W/mK or less, 18 W/mK or less, 16 W/mK or less, 14 W/mK or less, 12 W/mK or less, 10 W/mK or less, 8 W/mK or less, 6 W/mK or less, or 4 W/mK or less.

The cured product of the curable composition according to one example of the present application may have a thermal resistance of about 5 K/W or less, about 4.5 K/W or less, about 4 K/W or less, about 3.5 K/W or less, about 3 K/W or less, or about 2.8 K/W or less. When it is adjusted so that the heat resistance in this range can appear, excellent cooling efficiency or heat dissipation efficiency can be secured. The heat resistance may be a numerical value measured according to ASTM D5470 standard or ISO 22007-2 standard, and the measuring method is not particularly limited.

The cured product of the curable composition according to one example of the present application may have an adhesive force (or peel force) to a PET (polyethylene terephthalate) film of about 600 kgf/cm or more, 625 kgf/cm or more, 650 kgf/cm or more, 675 kgf/cm cm or more, 700 kgf/cm or more, 725 kgf/cm or more, 750 kgf/cm or more, 775 kgf/cm or more, about 800 kgf/cm or more, 810 kgf/cm or more, 820 kgf/cm or more, 830 kgf/cm or more, 840 kgf/cm or more, or 850 kgf/cm or more. In another example, the cured product of the curable composition may have an adhesive force (or peel force) to a PET (polyethylene terephthalate) film of about 1,500 kgf/cm or less, about 1,400 kgf/cm or less, about 1,300 kgf/cm or less, about 1,200 kgf/cm cm or less, or about 1,150 kgf/cm or less. In the cured product of the curable composition, the adhesive force (or peel force) to a PET (polyethylene terephthalate) film may be included within the range formed by appropriately selecting the upper and lower limits as listed above. Here, the adhesive force (or peel force) may be a value measured at room temperature using an adhesive force measuring device (or a physical property measuring device capable of measuring the adhesive force) at a peel rate of 300 mm/min and a peel angle of 180 degrees. The adhesive force may be specifically measured according to the following method for measuring physical properties.

In addition, the adhesive force may be an adhesive force to any substrate or module case with which the cured product of the curable composition is in contact. If such an adhesive force can be secured, the excellent adhesive force can appear to various materials, for example, a case or battery cell included in a battery module, and the like. In addition, if the adhesive force in this range is secured, peeling or the like by volume changes during charging and discharging of battery cells in the battery module, changes in the use temperatures of the battery module or curing shrinkage, and the like is prevented, whereby excellent durability can be secured.

The cured product of the curable composition according to one example of the present application may secure durability in order to be applied to products requiring a long warranty period such as automobiles (in the case of automobiles, about 15 years or more). The durability may mean that after a thermal shock test in which one cycle is set to a process of maintaining the temperature at a low temperature of about −40° C. for 30 minutes and then raising the temperature to 80° C. and maintaining it for 30 minutes, and the cycle is repeated 100 times, separating or peeling, or cracks do not occur from the module case or battery cells of the battery module.

The cured product of the curable composition according to one example of the present application may have electrical insulation of about 3 kV/mm or more, about 5 kV/mm or more, about 7 kV/mm or more, 10 kV/mm or more, 15 kV/mm or more, or 20 kV/mm or more. As a dielectric breakdown voltage has a higher value, the cured product of the curable composition shows excellent insulation, where it may be about 50 kV/mm or less, 45 kV/mm or less, 40 kV/mm or less, 35 kV/mm or less, or 30 kV/mm or less, but is not particularly limited. In order to achieve such a dielectric breakdown voltage, an insulating filler may be applied to the curable composition. In general, among thermally conductive fillers, a ceramic filler is known as a component capable of securing insulation. The electrical insulation may be measured with a dielectric breakdown voltage measured according to ASTM D149 standard. In addition, if the cured product of the curable composition can secure the electrical insulation as above, stability can be secured while maintaining performance with respect to various materials, for example, a case or battery cell included in a battery module, and the like.

The cured product of the curable composition according to one example of the present application may have a specific gravity of 5 or less. In another example, the specific gravity may be 4.5 or less, 4 or less, 3.5 or less, or 3 or less. As the specific gravity of the cured product of the curable composition has a lower value, it is more advantageous for weight saving of the applied product, so that the lower limit thereof is not particularly limited. For example, the specific gravity may be about 1.5 or more, or 2 or more. In order for the cured product of the curable composition to exhibit such a specific gravity, for example, a method of applying a filler that the desired thermal conductivity can be secured even at a low specific gravity when the thermal conductive filler is added, that is, a filler having a low specific gravity by itself, or applying a surface-treated filler, or the like may be used.

It is appropriate that the cured product of the curable composition according to one example of the present application does not include a volatile material if possible. For example, in the cured product of the curable composition, the ratio of nonvolatile components may be 90 wt % or more, 95 wt % or more, or 98 wt % or more. Here, the ratio with the nonvolatile component can be defined in the following manner. That is, with regard to the nonvolatile content, a portion remaining after the cured product of the curable composition is maintained at 100° C. for about 1 hour can be defined as the nonvolatile content, and thus the ratio can be measured based on the ratio after maintaining it at 100° C. for 1 hour or so with the initial weight of the cured product of the curable composition.

The cured product of the curable composition according to one example of the present application may have an excellent resistance to deterioration, if necessary, where stability that does not react chemically, if possible, may be required.

It may be advantageous for the cured product of the curable composition according to one example of the present application to have a low shrinkage ratio during or after curing. Through this, it is possible to prevent occurrence of peeling or voids, and the like that may occur in the process of manufacturing or using various materials, for example, a case or battery cell included in a battery module, and the like. The shrinkage ratio may be appropriately adjusted within a range capable of exhibiting the above-described effects, which may be, for example, less than 5%, less than 3%, or less than about 1%. Since the shrinkage ratio is more advantageous as the numerical value is lower, the lower limit thereof is not particularly limited.

The cured product of the curable composition according to one example of the present application may also advantageously have a low coefficient of thermal expansion (CTE). Through this, it is possible to prevent occurrence of peeling or voids, and the like that may occur in the process of manufacturing or using various materials, for example, a case or battery cell included in a battery module, and the like. The coefficient of thermal expansion may be appropriately adjusted within a range capable of exhibiting the above-described effects, which may be, for example, less than 300 ppm/K, less than 250 ppm/K, less than 200 ppm/K, less than 150 ppm/K, or less than 100 ppm/K. Since the coefficient of thermal expansion is more advantageous as the numerical value is lower, the lower limit thereof is not particularly limited.

In the cured product of the curable composition according to one example of the present application, tensile strength may be appropriately adjusted, and through this, an excellent impact resistance and the like may be secured. The tensile strength may be adjusted, for example, in the range of about 1.0 MPa or more.

In the cured product of the curable composition according to one example of the present application, elongation may be appropriately adjusted, and through this, the excellent impact resistance may be secured. The elongation may be adjusted, for example, in the range of about 10% or more or about 15% or more.

It may be advantageous that the cured product of the curable composition according to one example of the present application also exhibits appropriate hardness. The term appropriate hardness as used herein may be hardness to which the cured product of the curable composition is not evaluated as being brittle. When the hardness of the cured product of the curable composition is excessively high, the cured product of the curable composition is excessively brittle, which may adversely affect reliability. In addition, through the adjustment of the hardness, the impact resistance and vibration resistance can be ensured, and the durability of the product can be ensured.

The cured product of the curable composition according to one example of the present application is produced to have a width of about 10 cm, a length of about 20 cm and a thickness of about 2 mm, and then checked whether it is broken in a powder form when scraped with tweezers, where the case that does not break can be evaluated as being not brittle.

In addition, the cured product of the curable composition may have, for example, hardness of less than 100, 99 or less, 98 or less, 95 or less, or 93 or less in the shore A type, or may have hardness of less than about 80, less than about 70 or about 65 or less, or about 60 or less in the shore D type. The lower limit of the hardness is not particularly limited. For example, with regard to the hardness, the hardness in the shore A type may be about 60 or more, or the hardness in the shore OO type may be 5 or more or about 10 or more or so. The hardness of the cured product of the curable composition usually depends on the type or ratio of the filler contained in the resin layer, and when an excessive amount of the filler is included, the hardness usually increases.

In the cured product of the curable composition according to one example of the present application, a 5% weight loss temperature in thermogravimetric analyses (TGA) may also be 400° C. or higher, or the remaining amount at 800° C. may be 70 wt % or more. Due to these characteristics, stability at high temperature may be further improved with respect to various materials, for example, a case or battery cell included in a battery module, and the like. In another example, the remaining amount at 800° C. may be about 75 wt % or more, about 80 wt % or more, about 85 wt % or more, or about 90 wt % or more. In another example, the remaining amount at 800° C. may be about 99 wt % or less. The thermogravimetric analysis (TGA) may be measured within a range of 25° C. to 800° C. at a temperature increase rate of 20° C./min under a nitrogen ($N_2$) atmosphere of 60 $cm^3$/min. The thermogravimetric analysis (TGA) results can also be achieved by adjusting the composition of the cured product of the curable composition. For example, the remaining amount at 800° C. depends on the type or ratio of the thermally conductive filler contained in the cured product of the curable composition, and when an excessive amount of the thermally conductive filler is included, the remaining amount increases. However, when the polymer and/or monomer used in the curable composition has generally high heat resistance compared to other polymers and/or monomers, the remaining amount more increases, and the polymer and/or monomer component included in the cured product of the curable composition also affects the hardness as such.

The mixing order of the curable composition according to one example of the present application is not particularly limited as long as all necessary components such as a filler, an acrylic monomeric component and an acrylic polymeric component can be included. The acrylic polymeric component may be formed by polymerizing the acrylic polymerization precursor composition, as described above.

Use

A device according to one example of the present application may be one comprising an exothermic element; and a cooling region, wherein a cured product of the curable composition according to one example of the present application in thermal contact with the both is included between the exothermic element and the cooling region.

The device according to one example of the present application includes, for example, various electric and electronic products such as a clothes iron, a washing machine, a dryer, a clothes manager, an electric shaver, a microwave oven, an electric oven, an electric rice cooker, a refrigerator, a dishwasher, an air conditioner, a fan, a humidifier, an air purifier, a mobile phone, a radiotelegraph, a television, a radio, a computer and a laptop, or batteries such as a secondary battery, where the cured product of the curable composition can radiate heat generated in the device. In particular, in a battery for an electric car manufactured by gathering battery cells to form one battery module and combining several battery modules to form one battery pack, the curable composition of the present application may be used as a material for connecting the battery modules. When the curable composition of the present application is used as a material for connecting the battery modules, it may serve to dissipate heat generated in the battery cell and fix the battery cells from external shock and vibration.

The cured product of the curable composition of the present application may transfer heat generated from the exothermic element to the cooling region. That is, the cured product of the curable composition may radiate heat generated from the exothermic element.

The cured product of the curable composition may be positioned between the exothermic element and the cooling region to thermally contact them. The thermal contact means that the cured product of the curable composition is in physically direct contact with the exothermic element and the cooling region to radiate heat generated from the exothermic element to the cooling region, or even if the cured product of the curable composition is not in direct contact with the exothermic element and the cooling region (that is, there is a separate layer between the cured product of the curable composition and the exothermic element and/or the cooling region), it dissipates heat generated from the exothermic element to the cooling region.

Advantageous Effects

The present application may provide a curable composition capable of ensuring excellent storage stability regardless of environmental changes by having excellent resistance to moisture and humidity.

Also, the present application may provide a curable composition that exhibits room temperature curability and quick curability in a high humidity environment even if an excessive amount of a filler composition is included.

Furthermore, the present application may provide a curable composition that exhibits appropriate viscosity, thixotropy, adhesion and/or thermal conductivity before and after curing.

In addition, the present application may provide a curable composition capable of forming a cured product which is not brittle and flexible by adjusting hardness.

BEST MODE

Hereinafter, the present application will be described through Examples and Comparative Examples, but the scope of the present application is not limited by the contents presented below.

Example 1

To a 2 L glass reactor, an acrylic polymerization precursor composition formed by mixing tetrahydrofurfuryl methacrylate (THFMA), acrylamide (AA), 2-hydroxyethyl acrylate (2-HEA) and 1-dodecyl mercaptan (DM) as a molecular weight regulator in a weight ratio of 100:6.59:3.30:6.59 (THFMA:AA:2-HEA:DM) was introduced. Thereafter, the glass reactor was purged with nitrogen and simultaneously the temperature was raised from room temperature to about 62° C. over 1 hour. Thereafter, when the temperature of the reactor reached about 62° C., about 0.0047 wt % of a polymerization initiator (2,2'-azobis(4-methoxy-2,4-dimethylvaleronitrile) (V-70), Fujifilm) relative to the total weight of the acrylic polymerization precursor composition was introduced into the reactor and reacted under a reaction temperature not exceeding about 70° C. During the polymerization reaction, the polymerization initiator was further introduced three times at the same amount, so that the total initiation number was four times. The polymerization reaction was carried out until it had an appropriate weight average molecular weight, and a reaction composition (R) comprising an acrylic polymeric component having a weight average molecular weight of about 7,000 g/mol was prepared. At this time, the reaction composition (R) comprised 46.13 wt % of the acrylic polymeric component (i.e., the conversion ratio was 46.13%), and the viscosity of the acrylic polymeric component measured at room temperature was 1,850 cP. The conversion ratio was calculated by collecting a specific mass of the reaction composition (R), putting it on an aluminum plate, placing it in an oven preheated to about 150° C. to dry it for 50 minutes, and then using the weight difference value between the dried reaction composition (R') and the reaction composition (R). Also, in the present application, the conversion ratio of the reaction composition (R) was measured as described above.

Here, the reaction composition (R), tetrahydrofurfuryl methacrylate (THFMA) and 2-hydroxyethyl acrylate (2-hydroxypropyl metacrylate, 2-HPMA) were mixed in a weight ratio of 100:43.20:10.80 (R:THFMA:2-HPMA) to prepare a primary mixture (M1) (solid content about 30%).

A filler composition (F) was prepared by mixing plate-shaped alumina (F1) having a particle average particle diameter of about 1.6 μm, spherical alumina (F2) having a particle average particle diameter of about 70 μm and aluminum hydroxide (F3) having a particle average particle diameter of about 50 μm in a weight ratio of 360:360:180 (F1:F2:F3).

Here, the primary mixture (M1) and the filler composition (F) were mixed in a weight ratio of 1:9 (M1:F) to prepare a secondary mixture (M2), and about 6.68 parts by weight or so of methyl ethyl ketone peroxide (MEKP) relative to 100 parts by weight of the acrylic polymeric component and about 0.33 parts by weight or so of cobalt naphthalic acid relative to 100 parts by weight of the acrylic polymeric component were further added to the secondary mixture (M2) to prepare a final curable composition (P).

Example 2

A reaction composition (R) comprising an acrylic polymeric component having a weight average molecular weight of about 7,000 g/mol was prepared in the same manner as in Example 1 above, except that the polymerization initiator was more introduced one time during the polymerization reaction, whereby the total initiation number was 5 times. A reaction composition (R) was prepared. At this time, the reaction composition (R) comprised 60.13 wt % of the acrylic polymeric component (i.e., the conversion ratio was 60.13%), and the viscosity of the acrylic polymeric component measured at room temperature was 5,400 cP.

Here, the reaction composition (R), tetrahydrofurfuryl methacrylate (THFMA) and 2-hydroxyethyl acrylate (2-hydroxypropyl metacrylate, 2-HPMA) were mixed in a weight ratio of 100:16:4 (P:THFMA:2-HPMA) to prepare a primary mixture (M1) (solid content about 50%).

As the filler composition (F), the same one as that prepared in Example 1 above was used.

Here, the primary mixture (M1) and the filler composition (F) were mixed in a weight ratio of 1:9 (M1:F) to prepare a secondary mixture (M2), and about 6.68 parts by weight or so of methyl ethyl ketone peroxide (MEKP) relative to 100 parts by weight of the acrylic polymeric component and about 0.33 parts by weight or so of cobalt naphthalic acid relative to 100 parts by weight of the acrylic polymeric component were further added to the secondary mixture (M2) to prepare a final curable composition (P).

Example 3

A final curable composition (P) was prepared in the same manner as in Example 1 above, except that the reaction composition (R) having a weight average molecular weight of about 13,000 g/mol and comprising 46.13 wt % of the acrylic polymeric component (i.e., the conversion ratio was 46.13%) was prepared, although it was prepared in the same manner as in Example 1 above.

Example 4

A final curable composition (P) was prepared in the same manner as in Example 2 above, except that the reaction composition (R) having a weight average molecular weight of about 13,000 g/mol and comprising 60.13 wt % of the acrylic polymeric component (i.e., the conversion ratio was 60.13%) was prepared, although it was prepared in the same manner as in Example 2 above.

Comparative Example 1

Tetrahydrofurfuryl methacrylate (THFMA) and 2-hydroxyethyl acrylate (2-hydroxypropyl metacrylate, 2-HPMA) were mixed in a weight ratio of 80:20 (THFMA:2-HPMA) to prepare a primary mixture (M1).

A filler composition (F) was prepared by mixing plate-shaped alumina (F1) having a particle average particle diameter of about 1.6 μm, spherical alumina (F2) having a particle average particle diameter of about 70 μm and aluminum hydroxide (F3) having a particle average particle diameter of about 50 μm in a weight ratio of 360:360:180 (F1:F2:F3).

Here, the primary mixture (M1) and the filler composition (F) were mixed in a weight ratio of 1:9 (M1:F) to prepare a secondary mixture (M2), and about 2 parts by weight or so of methyl ethyl ketone peroxide (MEKP) relative to 100 parts by weight of the primary mixture (M1) and about 0.1 parts by weight or so of cobalt naphthalic acid relative to 100 parts by weight of the primary mixture (M1) were further added to the secondary mixture (M2) to prepare a final curable composition (P).

Comparative Example 2

A secondary mixture (M2) was prepared by mixing the reaction composition (R) and the filler composition (F), which were prepared in the same manner as in Example 2 above, in a weight ratio of 1:9 (R:F), and about 6.68 parts by weight or so of methyl ethyl ketone peroxide (MEKP)

relative to 100 parts by weight of the acrylic polymeric component and about 0.33 parts by weight or so of cobalt naphthalic acid relative to 100 parts by weight of the acrylic polymeric component were further added to the secondary mixture (M2) to prepare a final curable composition (P).

Comparative Example 3

The reaction composition (R) prepared in the same manner as in Example 1 above, tetrahydrofurfuryl methacrylate (THFMA) and 2-hydroxyethyl acrylate (2-hydroxypropyl metacrylate, 2-HPMA) were mixed in a weight ratio of 100:104:26 (R:THFMA:2-HPMA) to prepare a primary mixture (M1) (solid content about 20%).

As the filler composition (F), the same one as that prepared in Example 1 above was used.

Here, the primary mixture (M1) and the filler composition (F) were mixed in a weight ratio of 1:9 (M1:F) to prepare a secondary mixture (M2), and about 6.68 parts by weight or so of methyl ethyl ketone peroxide (MEKP) relative to 100 parts by weight of the acrylic polymeric component and about 0.33 parts by weight or so of cobalt naphthalic acid relative to 100 parts by weight of the acrylic polymeric component were further added to the secondary mixture (M2) to prepare a final curable composition (P).

Comparative Example 4

A final curable composition (P) was prepared in the same manner as in Example 1 above, except that the reaction composition (R) having a weight average molecular weight of about 15,000 g/mol and comprising 46.13 wt % of the acrylic polymeric component (i.e., the conversion ratio was 46.13%) was prepared, although it was prepared in the same manner as in Example 1 above.

Comparative Example 5

The reaction composition (R) prepared in the same manner as in Example 1 above, tetrahydrofurfuryl methacrylate (THFMA) and 2-hydroxyethyl acrylate (2-hydroxypropyl metacrylate, 2-HPMA) were mixed in a weight ratio of 100:7380.8:1845.2 (R:THFMA:2-HPMA) to prepare a primary mixture (M1) (solid content about 0.5%).

As the filler composition (F), the same one as that prepared in Example 1 above was used.

Here, the primary mixture (M1) and the filler composition (F) were mixed in a weight ratio of 1:9 (M1:F) to prepare a secondary mixture (M2), and about 6.68 parts by weight or so of methyl ethyl ketone peroxide (MEKP) relative to 100 parts by weight of the acrylic polymeric component and about 0.33 parts by weight or so of cobalt naphthalic acid relative to 100 parts by weight of the acrylic polymeric component were further added to the secondary mixture (M2) to prepare a final curable composition (P).

Comparative Example 6

The reaction composition (R) prepared in the same manner as in Example 1 above, tetrahydrofurfuryl methacrylate (THFMA) and 2-hydroxyethyl acrylate (2-hydroxypropyl metacrylate, 2-HPMA) were mixed in a weight ratio of 100:1476.16:369.04 (R:THFMA:2-HPMA) to prepare a primary mixture (M1) (solid content about 2.37%).

As the filler composition (F), the same one as that prepared in Example 1 above was used.

Here, the primary mixture (M1) and the filler composition (F) were mixed in a weight ratio of 1:9 (M1:F) to prepare a secondary mixture (M2), and about 6.68 parts by weight or so of methyl ethyl ketone peroxide (MEKP) relative to 100 parts by weight of the acrylic polymeric component and about 0.33 parts by weight or so of cobalt naphthalic acid relative to 100 parts by weight of the acrylic polymeric component were further added to the secondary mixture (M2) to prepare a final curable composition (P).

<Method of Measuring Physical Properties>

(1) Curing Efficiency Evaluation Method of Curable Composition

For each of the curable compositions (P) prepared in Examples and Comparative Examples above, the ratio (Va/Vb) of the viscosity (Va) measured immediately after 4 hours elapsed after curing initiation in a high-humidity environment (about 70 RH % or more) and at room temperature to the viscosity (Vb) measured on curing initiation was measured. If the ratio (Va/Vb) of the viscosity was 10,000 or more, it was evaluated as O (excellent curing efficiency), and if it was less than 10,000, it was evaluated as X (inadequate curing efficiency). The viscosity was measured using a spindle 63 using Brookfield AMETEK/DV3T.

(2) Adhesive Force Evaluation Method

A glass substrate having a thickness of 1 mm was prepared, and two glass dams having a thickness of 2 mm were installed so that a predetermined interval was formed on the glass substrate. Each of the curable compositions (P) prepared in Examples and Comparative Examples above was uniformly applied to the predetermined interval formed by the glass dams so that bubbles were not generated. An aluminum pouch, in which a PET (polyethylene terephthalate) interface was present, was cut to have a width of 10 mm and a length of 200 mm, and then attached thereto so that the PET interface of the aluminum pouch contacted on the applied curable composition (P). Thereafter, after attaching a release paper, a glass plate was placed on the release paper so that the curable composition (P) was subjected to sufficient pressure and left at room temperature for about 24 hours, and then the placed glass plate and release film were removed. Thereafter, the attached aluminum pouch was peeled off at a peel angle of 180 degrees and at a speed of 300 mm/min with a physical property measuring device (manufacturer: stable micro systems, Texture analyzer), and the adhesive force of the cured product of the curable composition (P) was measured.

(3) Brittleness Evaluation Method

A cured product, in which each of the curable compositions (P) prepared in Examples and Comparative Examples was cured in a high humidity environment (about 70RH % or more) and at room temperature, was prepared to have a width of about 10 cm, a length of about 20 cm and a thickness of about 2 mm, and then it was checked whether it was broken in a powder form when scraped with tweezers, where the case that was not broken was evaluated as O (not brittle) and the case that was broken was evaluated as X (being brittle).

(4) Thermal Conductivity Evaluation Method

The thermal conductivity was measured using a hot disk method. Specifically, the thermal conductivity was measured, in a state where each of the curable compositions (P) prepared in Examples and Comparative Examples above was cured into a disk type sample having a diameter of 2 cm and a thickness of 500 μm, with a thermal analysis device (thermal constant analyzer) according to ISO 22007-2 standard along the thickness direction of the sample.

The results of the test data measured in Examples and Comparative Examples above were summarized in Table 1 below.

TABLE 1

| Classification | | Curing efficiency evaluation | Adhesive force (kgf/cm) | Brittleness evaluation | Thermal conductivity (W/mK) |
|---|---|---|---|---|---|
| Example | 1 | ○ | 1,002 | ○ | 3.021 |
| | 2 | ○ | 988 | ○ | 3.102 |
| | 3 | ○ | 1,020 | ○ | 3.082 |
| | 4 | ○ | 997 | ○ | 3.003 |
| Comparative | 1 | ○ | 450 | X | 2.987 |
| Example | 2 | ○ | 490 | X | 2.087 |
| | 3 | X | unmeasurable | unmeasurable | unmeasurable |
| | 4 | X | unmeasurable | unmeasurable | unmeasurable |
| | 5 | X | unmeasurable | unmeasurable | unmeasurable |
| | 6 | X | unmeasurable | unmeasurable | unmeasurable |

As shown in Table 1, it can be seen that Examples 1 to 4 have showed excellent curing efficiency even at room temperature and high humidity environment, have secured the desired adhesive force and thermal conductivity in the present application, and have not done brittle.

On the other hand, it can be seen that Comparative Examples 1 and 2 have cured within 24 hours at room temperature and high humidity environment, but the cured product has been brittle because it has low adhesive force and has not secured flexibility.

Furthermore, in Comparative Examples 3 to 6, the mixing between the respective components of the curable composition was not made, and thus the curing was not made. In addition, it was impossible to form a cured product, so that it was also impossible to evaluate the adhesive force, brittleness and thermal conductivity.

The invention claimed is:

1. A curable composition comprising a filler composition, an acrylic monomeric component and an acrylic polymeric component;

wherein one or more selected from the acrylic monomeric component or polymerization units of the acrylic polymeric component comprise a cyclic ether-based acrylic compound, and the cyclic ether-based acrylic compound comprises a compound represented by Formula 2:

[Formula 2]

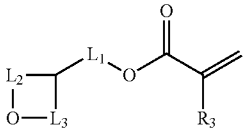

wherein, $R_3$ is hydrogen or an alkyl group having 1 to 20 carbon atoms, $L_1$ and $L_2$ are each independently a single bond or an alkylene group, and $L_3$ is an alkylene group, and the curable composition forms a cured product having a thermal conductivity of 1.2 W/mK or more.

2. The curable composition according to claim 1, wherein the acrylic polymeric component is included in a range of 2.5 wt % to 5.5 wt % relative to the total weight of the curable composition.

3. The curable composition according to claim 1, wherein the filler composition is included in a range of 1,000 parts by weight to 6,000 parts by weight relative to 100 parts by weight of the acrylic polymeric component.

4. The curable composition according to claim 1, wherein the acrylic monomeric component is included in a range of 70 parts by weight to 380 parts by weight relative to 100 parts by weight of the acrylic polymeric component.

5. The curable composition according to claim 1, wherein the polymerization units of the acrylic polymeric component comprise the cyclic ether-based acrylic compound in an amount of 70 wt % or more relative to the total weight of the curable composition.

6. The curable composition according to claim 1, wherein the polymerization units of the acrylic polymeric component comprise the cyclic ether-based acrylic compound and a hydroxy group-containing acrylic compound.

7. The curable composition according to claim 6, wherein the polymerization units of the acrylic polymeric component comprise the hydroxy group-containing acrylic compound in a range of 0.1 to 10 parts by weight relative to 100 parts by weight of the cyclic ether-based acrylic compound.

8. The curable composition according to claim 6, wherein the hydroxy group-containing acrylic compound comprises a compound represented by Formula 3:

[Formula 3]

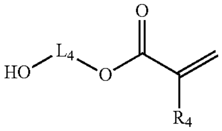

wherein, $R_4$ is hydrogen or an alkyl group having 1 to 20 carbon atoms, $L_4$ is one selected from the group consisting of an alkylene group having 1 to 20 carbon atoms, an alkenylene group having 2 to 20 carbon atoms, an alkynylene group having 2 to 20 carbon atoms, an arylene group having 6 to 30 carbon atoms and a heteroarylene group having 5 to 30 ring atoms.

9. The curable composition according to claim 1, wherein the polymerization units of the acrylic polymeric component comprise the cyclic ether-based acrylic compound and acrylamide.

10. The curable composition according to claim 9, wherein the polymerization units of the acrylic polymeric component comprise the acrylamide in a range of 1 to 30 parts by weight relative to 100 parts by weight of the cyclic ether-based acrylic compound.

11. The curable composition according to claim 1, wherein the acrylic polymeric component has a weight average molecular weight in a range of 1,000 to 14,500 g/mol.

12. The curable composition according to claim 1, wherein the acrylic monomeric component comprises the cyclic ether-based acrylic compound in an amount of 60 wt % or more relative to the total weight of the acrylic monomeric component.

13. The curable composition according to claim 1, wherein the acrylic monomeric component comprises the cyclic ether-based acrylic compound and a hydroxy group-containing acrylic compound.

14. The curable composition according to claim 13, wherein the acrylic monomeric component comprises the hydroxy group-containing acrylic compound in a range of 1 to 18 parts by weight relative to 100 parts by weight of the cyclic ether-based acrylic compound.

15. The curable composition according to claim 13, wherein the hydroxy group-containing acrylic compound comprises a compound represented by Formula 3:

[Formula 3]

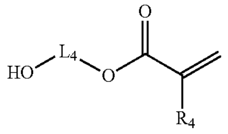

wherein, $R_4$ is hydrogen or an alkyl group having 1 to 20 carbon atoms, and $L_4$ is one selected from the group consisting of an alkylene group having 1 to 20 carbon atoms, an alkenylene group having 2 to 20 carbon atoms, an alkynylene group having 2 to 20 carbon atoms, an arylene group having 6 to 30 carbon atoms and a heteroarylene group having 5 to 30 ring atoms.

16. The curable composition according to claim 1, wherein the acrylic monomeric component comprises the cyclic ether-based acrylic compound and acrylamide.

17. The curable composition according to claim 16, wherein the acrylic monomeric component comprises the acrylamide in a range of 1 to 5 parts by weight relative to 100 parts by weight of the cyclic ether-based acrylic compound.

18. The curable composition according to claim 1, further comprising a peroxide compound and a metal catalyst.

19. The curable composition according to claim 18, wherein the peroxide compound is included in a range of 1 to 10 parts by weight relative to 100 parts by weight of the acrylic polymeric component, and the metal catalyst is included in a range of 0.01 to 1 part by weight relative to 100 parts by weight of the acrylic polymeric component.

* * * * *